United States Patent
Dai et al.

(10) Patent No.: US 12,393,841 B2
(45) Date of Patent: Aug. 19, 2025

(54) NEURAL NETWORK UPDATE METHOD, CLASSIFICATION METHOD AND ELECTRONIC DEVICE

(71) Applicant: SAMSUNG ELECTRONICS CO., LTD., Suwon-si (KR)

(72) Inventors: Bin Dai, Beijing (CN); Zhouchen Lin, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1007 days.

(21) Appl. No.: 17/168,564

(22) Filed: Feb. 5, 2021

(65) Prior Publication Data

US 2021/0241112 A1  Aug. 5, 2021

(30) Foreign Application Priority Data

Feb. 5, 2020  (CN) .......................... 202010080428.7
May 15, 2020  (CN) .......................... 202010413436.9
Nov. 26, 2020  (CN) .......................... 202011350485.9

(51) Int. Cl.
*G06N 3/082* (2023.01)
*G06F 18/214* (2023.01)
(Continued)

(52) U.S. Cl.
CPC ........... *G06N 3/082* (2013.01); *G06F 18/214* (2023.01); *G06N 3/063* (2013.01); *G06V 10/764* (2022.01); *G06V 10/774* (2022.01); *G06V 10/82* (2022.01)

(58) Field of Classification Search
CPC ...... G06F 18/214; G06N 3/045; G06N 3/047; G06N 3/048; G06N 3/063; G06N 3/082;
(Continued)

(56) References Cited

U.S. PATENT DOCUMENTS 10,817,042 B2   10/2020   Desai et al.
11,151,450 B2   10/2021   Zoldi et al.
(Continued)

FOREIGN PATENT DOCUMENTS

KR   10-2163561 B1   10/2020
WO   2017/152990 A1   9/2017
WO   2018/226492 A1   12/2018
WO   2019/086104 A1   5/2019

OTHER PUBLICATIONS

Dai et al., "Compressing Neural Networks using the Variational Information Bottleneck", Apr. 19, 2018, arXiv:1802.10399v3. (Year: 2018).*

(Continued)

*Primary Examiner* — Brent Johnston Hoover
(74) *Attorney, Agent, or Firm* — Sughrue Mion, PLLC

(57) ABSTRACT

A neural network update method, a classification method and an electronic device thereof are provided. The neural network update method includes obtaining input data of the neural network; identifying an active neuron and an inactive neuron from among at least one neuron included in the neural network; and based on an information bottleneck of the at least one neuron, training the neural network based on the input data while maintaining information bottleneck of the active neuron.

14 Claims, 14 Drawing Sheets

(51) Int. Cl.
  *G06N 3/063* (2023.01)
  *G06V 10/764* (2022.01)
  *G06V 10/774* (2022.01)
  *G06V 10/82* (2022.01)

(58) Field of Classification Search
  CPC .... G06N 3/084; G06V 10/764; G06V 10/774; G06V 10/82
  See application file for complete search history.

(56) References Cited

U.S. PATENT DOCUMENTS

| | | |
|---|---|---|
| 2016/0275397 A1 | 9/2016 | Neil et al. |
| 2017/0213129 A1 | 7/2017 | Lee |
| 2017/0249547 A1 | 8/2017 | Shrikumar et al. |
| 2018/0174028 A1 | 6/2018 | Lin et al. |
| 2018/0260709 A1 | 9/2018 | Zhang et al. |
| 2018/0260710 A1 | 9/2018 | Zhang et al. |
| 2018/0260711 A1 | 9/2018 | Zhang et al. |
| 2019/0258937 A1* | 8/2019 | Alemi ............... G06N 3/084 |
| 2020/0012945 A1 | 1/2020 | Yaguchi et al. |

OTHER PUBLICATIONS

International Search Report (PCT/ISA/210) issued by the International Searching Authority in International Application No. PCT/KR2021/001596, issued on May 6, 2021.

Written Opinion (PCT/ISA/237) issued by the International Searching Authority in International Application No. PCT/KR2021/001596, issued on May 6, 2021.

Kirkpatrick, James et al., "Overcoming catastrophic forgetting in neural networks", Proceedings of the National Academy of Sciences, Mar. 28, 2017, vol. 114, No. 13, pp. 3521-3526. (6 pages total).

Titsias, Michalis K. et al., "Functional Regularisation for Continual Learning Using Gaussian Processes", arXiv:1901.11356v1, [stat.ML], Jan. 31, 2019. (13 pages total).

Li, Xilai et al., "Learn to Grow: A Continual Structure Learning Framework for Overcoming Catastrophic Forgetting", arXiv:1904.00310v3, [cs.LG], May 21, 2019. (12 pages total).

Rebuffi, Sylvestre-Alvise et al., "iCaRL: Incremental Classifier and Representation Learning", Proceedings of the IEEE Conference on Computer Vision and Pattern Recognition, 2017, pp. 2001-2010. (10 pages total).

Chaudhry, Arslan et al., "Riemannian Walk for Incremental Learning: Understanding Forgetting and Intransigence", Proceedings of the European Conference on Computer Vision (ECCV), 2018. (16 pages total).

Yanhua Wang et al., "On-line model updating method for hybrid testings based on the forgetting factor and LMBP neural network", Journal of Vibration and Shock, vol. 39, No. 9, 2020, 8 pages, DOI: 10.13465/j.cnki.jvs.2020.09.006.

Communication issued on Jan. 24, 2025 by the China National Intellectual Property Administration for Chinese Patent Application No. 202011350485.9.

Office Action issued on Jul. 5, 2025 by the Chinese Patent Office in corresponding CN Patent Application No. 202011350485.9.

* cited by examiner i-th hidden layer     (i+1)-th hidden layer

L-th hidden layer          output layer

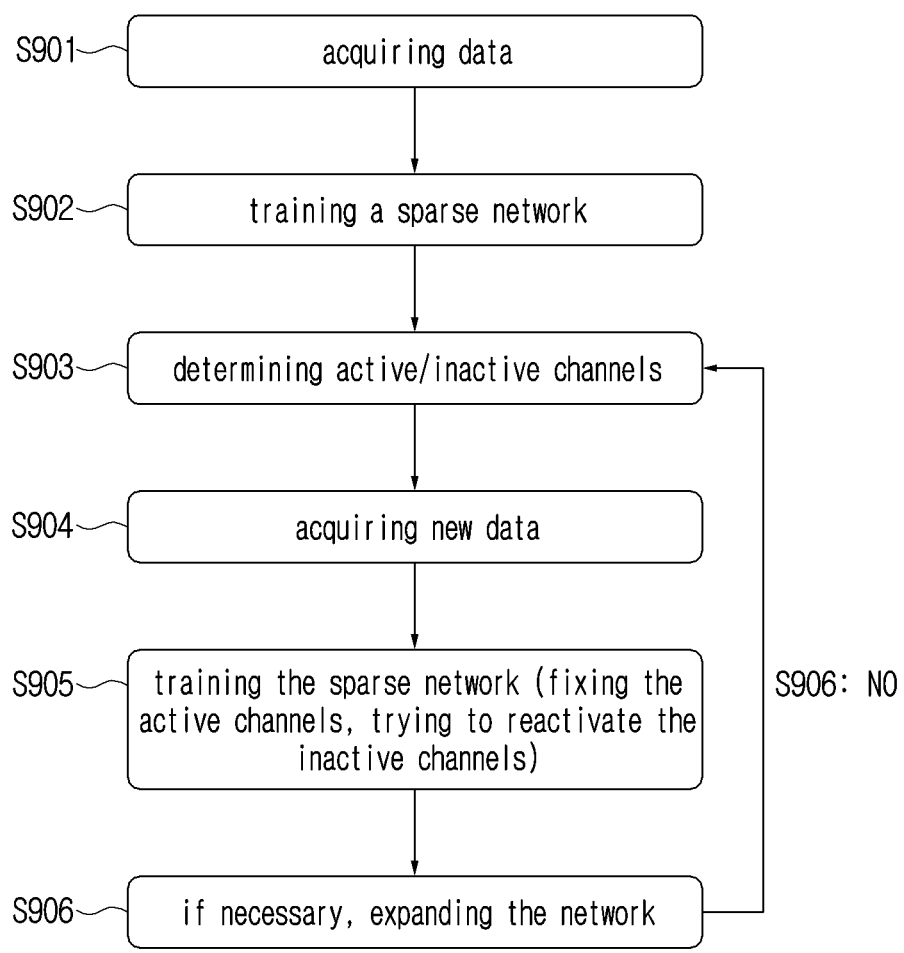

first training phase second training phase completion state of first training phase completion state of second training phase

NEURAL NETWORK UPDATE METHOD, CLASSIFICATION METHOD AND ELECTRONIC DEVICE

CROSS REFERENCE TO RELATED APPLICATION(S)

This application is based on and claims priority under 35 U.S.C. § 119(a) to Chinese Patent Application No. 202010080428.7, filed Feb. 5, 2020, Chinese Patent Application No. 202010413436.9, filed May 15, 2020, and Chinese Patent Application No. 202011350485.9, filed Nov. 26, 2020 in the National Intellectual Property Administration, PRC, the disclosures of which are incorporated by reference herein in their entireties.

BACKGROUND

1. Field

The present disclosure relates to continual learning scenarios in the field of artificial intelligence. More specifically, the present disclosure relates to a neural network update method, a classification method and an electronic device thereof.

2. Description of Related Art

Traditional machine learning is performed for fixed tasks, that is, the dataset used to train a neural network (also called a neural network model or a learning model) contains training data with a fixed distribution. When a new dataset (e.g., a dataset containing training data with a new distribution different from the fixed distribution) is input, it is generally necessary to retrain the neural network. After retraining, the neural network can give a response to the new dataset, but may not give a response to the original dataset (e.g., the dataset containing the fixed class of data). This issue is called "Catastrophic Forgetting" in machine learning. In fact, the "Catastrophic Forgetting" is the result of the "Stability-Plasticity Dilemma" faced by machine learning, where the stability refers to the ability to maintain original knowledge while learning new knowledge and the plasticity refers to the ability to learn new knowledge.

Continual learning is to perform training for a continuous sequence composed of multiple different tasks on a neural network. Continual learning aims to solve the above-mentioned "Catastrophic Forgetting" issue. More specifically, it maintains the performance of the neural network in completing historical tasks while training the neural network based on new input data to adapt to new tasks. Continual learning is the key to continuously adjust a neural network to rapidly changing learning tasks, so it is very critical to realize the application of artificial intelligence in real scenarios. Therefore, there is a need to optimize the neural network to better maintain the performance on historical tasks while adapting to new tasks.

SUMMARY

Provided is a neural network update method, a classification method and an electronic device thereof.

According to an exemplary embodiment, there is provided an electronic apparatus including: at least one memory configured to store a neural network including a plurality of network layers, each of the plurality of network layers including at least one neuron; and at least one processor configured to: obtain input data of the neural network, identify an active neuron and an inactive neuron from among whether the at least one neuron included in the neural network, based on an information bottleneck of the at least one neuron, train the neural network based on the input data while maintaining information bottleneck of the active region.

The at least one processor is further configured to train the neural network by updating information bottleneck of the inactive neuron based on the input data while maintaining the information bottleneck of the active neuron.

The at least one processor is further configured to: based on the information bottleneck of the at least one neuron exceeding a predetermined value, identify the at least one neuron as the active neuron, and based on the amount of information being less than or equal to the predetermined value, identify the at least one neuron as the inactive neuron.

The plurality of network layer includes an input layer, at least one hidden layer and an output layer.

The at least one processor is further configured to: maintain weights between the active neuron in one of the at least one hidden layer and the active neuron in a previous network layer unchanged during the training, reset weights between the active neuron in the one of the at least one hidden layer and the inactive neuron in the previous network layer to 0, and maintain the reset weights unchanged during the training, and train weights between the inactive neuron in the one of the at least one hidden layer and each neuron in the previous network layer during the training.

The at least one processor is further configured to: based on the output layer being a multi-head output layer: maintain weights between the active neuron in the output layer and the active neuron in a previous network layer unchanged during the training, reset weights between the active neuron in the output layer and the inactive neuron in the previous network layer to 0, and maintain the reset weights unchanged during the training, train weights between the inactive neuron in the output layer and each neuron in the previous network layer during the training, and based on the output layer being a single-head output layer: train weights between each neuron in the output layer and each neuron in the previous network layer during the training.

The at least one processor is further configured to: add a neuron in one of the at least one hidden layer based on activation state of neuron included in the one of the at least one hidden layer, and train the neural network based on the input data.

The at least one processor is further configured to add the neuron in the one of the at least one hidden layer based on all neurons included in the one of the at least one hidden layer being the active neuron.

The neural network is a neural network trained in a sparsity promoting manner which uses as few neurons as possible based on another input data.

According to an exemplary embodiment, there is provided a control method of an electronic apparatus including: obtaining input data of the neural network; identifying an active neuron and an inactive neuron from among at least one neuron included in the neural network; and based on an information bottleneck of the at least one neuron, training the neural network based on the input data while maintaining information bottleneck of the active neuron.

The training comprises training the neural network by updating information bottleneck of the inactive neuron based on the input data while maintaining the information bottleneck of the active neuron.

The identifying comprises: based on the information bottleneck of the at least one neuron exceeding a predetermined value, identifying the at least one neuron as the active neuron, and based on the amount of information being less than or equal to the predetermined value, identifying the at least one neuron as the inactive neuron.

The plurality of network layers includes an input layer, at least one hidden layer and an output layer.

The training comprises: maintaining weights between the active neuron in one of the at least one hidden layer and the active neuron in a previous network layer unchanged during the training, resetting weights between the active neuron in the one of the at least one hidden layer and the inactive neuron in the previous network layer to 0, and maintaining the reset weights unchanged during the training, and training weights between the inactive neuron in the one of the at least one hidden layer and each neuron in the previous network layer during the training.

The training comprises: based on the output layer being a multi-head output layer: maintaining weights between the active neuron in the output layer and the active neuron in a previous network layer unchanged during the training, resetting weights between the active neuron in the output layer and the inactive neuron in the previous network layer to 0, and maintaining the reset weights unchanged during the training, training weights between the inactive neuron in the output layer and each neuron in the previous network layer during the training, and based on the output layer being a single-head output layer: training weights between each neuron in the output layer and each neuron in the previous network layer during the training.

The control method further includes: adding a neuron in one of the at least one hidden layer based on activation state of neuron included in the one of the at least one hidden layer.

The adding the neuron includes adding the neuron in the one of the at least one hidden layer based on all neurons included in the one of the at least one hidden layer being the active neuron.

The neural network is a neural network trained in a sparsity promoting manner which uses as few neurons as possible based on another input data.

Additional aspects will be set forth in part in the description which follows, and in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a flowchart showing a training procedure according to an embodiment;

DETAILED DESCRIPTION

Figure 1:
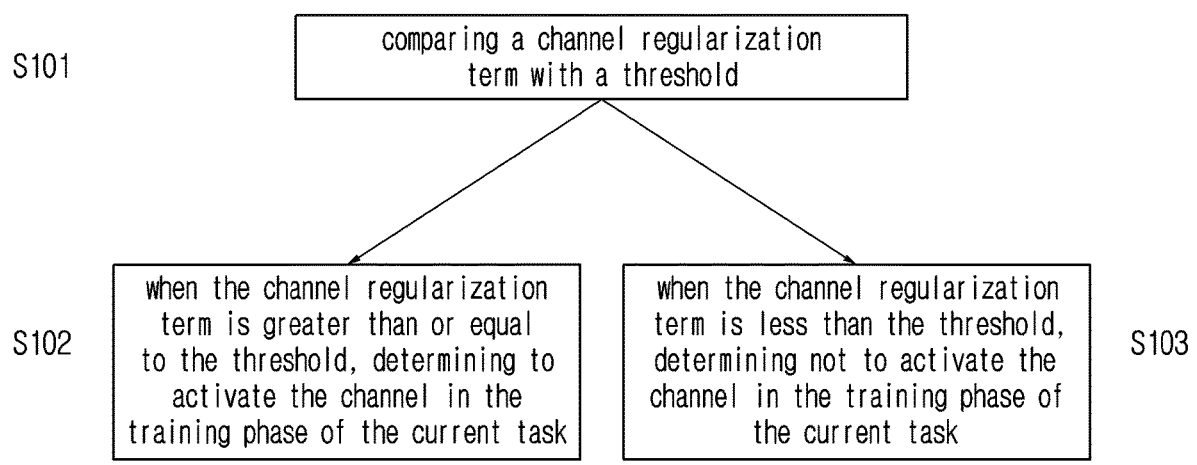
FIG. 1 is a flowchart illustrating operations for determining channel activation/deactivation according to an embodiment.

Exemplary embodiments of the present disclosure may be diversely modified. Specific exemplary embodiments are illustrated in the accompanying drawings and are described in detail in the description herein. However, it is to be understood that the present disclosure is not limited to the one or more specific exemplary embodiments, but includes all modifications, equivalents, and substitutions without departing from the scope and spirit of the present disclosure. Also, well-known functions or constructions are not described in detail below when it is determined that they would obscure the disclosure with unnecessary detail.

The disclosure will be described in greater detail below with reference to accompanying drawings.

The terms used in the embodiments of the disclosure are general terms that are currently widely used considering their respective functions. However, the terms may change depending on intention of one of ordinary skilled in the art, legal precedents, technical interpretation, emergence of new technologies, and the like. Further, in certain cases, there may be terms arbitrarily selected by the applicant, and this case, the meaning of the term will be described in detail in the corresponding description. Accordingly, the terms used herein are not to be construed simply as its designation but based on the meaning of the term and the overall context of the disclosure.

Expressions such as "comprise", "comprising", or any equivalents thereof are used herein as designating a presence of a characteristic (e.g., elements such as a number, a function, an operation, and a component), and do not exclude the presence of an additional characteristic.

The expression "at least one of a, b, and c," should be understood as including only a, only b, only c, both a and b, both a and c, both b and c, or all of a, b, and c.

Expressions such as "first", "second", and so on may be used to modify various elements regardless of order and/or importance. Further, it should be noted that the expressions are merely used to distinguish an element from another element, and should not be construed as a limitation to one or more elements.

A singular expression includes a plural expression, unless specifically indicated otherwise. It is to be understood that the terms such as "comprise" or any variations thereof are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, the term "user" may refer to a person using an electronic apparatus or an apparatus (e.g., artificial intelligence electronic apparatus).

In order to make certain aspects, features and advantages of the present disclosure more apparent, exemplary embodiments according to the present disclosure will be described in detail below with reference to the accompanying drawings. One or more exemplary embodiments are only a part of the embodiments of the present disclosure, rather than all the embodiments of the present disclosure, and it should be understood that the present disclosure is not limited by the exemplary embodiments described herein.

One of the disadvantages of deep learning is that it cannot continuously learn new information like the human brain. When the neural network is updated (or trained) for a new task, the information that has been learned may be forgotten by the neural network. For example, it is assumed that the neural network can perform classification processing on 10 different data classes. If the neural network is made to be able to classify 11 different data classes, that is to say, a new class is added, the neural network needs to be updated on the dataset containing the 11th class, and there is very little (even no) data from the first 10 classes. After the update phase is over, the neural network may forget the performance of the first 10 classes, and with more and more classes, the neural network may completely forget the classes updated earlier.

Continual learning is to perform training for a continuous sequence composed of multiple different tasks on a neural network. Continual learning aims to solve the above-mentioned "Catastrophic Forgetting" issue. This technology is in great demand in practical applications. For example, in an image-related application, users can be provided with an image classification function. In addition to predefined classes, classes can also allow to be customized by users. Therefore, it is necessary to use some images selected by users and a small amount of stored images to update the neural network.

Continual learning includes Single-Headed Learning and Multi-Headed Learning. In Single-Headed Learning, all tasks use an output layer structure, for example, Class-Incremental Learning (Class-IL) belongs to Single-Headed Learning. In Multi-Headed Learning, each task has an independent output layer, for example, Task-Incremental Learning (Task-IL) belongs to Multi-Headed Learning.

For the "Catastrophic Forgetting" issue in continual learning, there are two main solutions as follow.

The first solution is Regularization-based Method. For a neural network that has been trained based on previous tasks, the Regularization-based Method will estimate the importance of each parameter in the neural network to the previous tasks, generate a weight regularization term for each parameter based on the importance, and add the weight regularization term to a loss function. When performing training for a new task, the neural network using the Regularization-based Method will allow relatively unimportant parameters to have large changes to learn the new task, and will keep the degree of change of relatively important parameters as small as possible.

The second solution is Replay-based Method. This method uses a small storage space for storing input data samples belonging to previous tasks, and performs training on the input data samples while performing learning for a new task. When performing training for a new task, the neural network using the Replay-based Method will keep features extracted for the input data samples as similar as possible in feature representations with those when not performing training for the new task, so as to facilitate a model after performing training for the new task as close as possible, in the performance of completing the previous tasks, to the performance previous to performing training for the new task.

By using the above two methods, it is possible that the "Catastrophic Forgetting" issue in continual learning is mitigated, but the problem of "representation drift" remains unsolved. Specifically, for training a neural network for a new task, model parameters obtained according to the input data distribution of previous tasks will drift constantly as new tasks are added and will eventually be completely forgotten. Therefore, the neural network will be impacted in the performance of completing the previous tasks.

A learning model using the Regularization-based Method has several drawbacks, for example, 1) although the degree of change in relatively important parameters will be kept as small as possible, there are still subtle changes; 2) in addition, for each weight, important coefficients and parameters need to be stored, so a large storage space is required; 3) if there are too many new tasks, the network capacity needs to be expanded. The neural network cannot adaptively expand the network capacity. If the network capacity is automatically expanded whenever there is a new task, then there will also be the problem that the neural network cannot be efficiently utilized.

For a neural network using the Replay-based Method, 1) although a model after performing training for the new task will be kept as close as possible, in the performance of completing the previous tasks, to the performance previous to performing training for the new task, the performances fail to be exactly the same; 2) if there are too many new tasks, the network capacity needs to be expanded. The neural network cannot adaptively expand the network capacity. If the network capacity is automatically expanded whenever there is a new task, then there will also be the problem that the neural network cannot be efficiently utilized.

Therefore, the inability to solve the problem of "representation drift" is one of the limitations of continual learning. In addition, how to reduce the storage space of the neural network and how to adaptively expand the capacity of the neural network are also aspects needed to be optimized for continual learning. The size of the network will increase linearly with the number of new tasks.

The one or more embodiments of the present disclosure, relate to updating a neural network in the field of artificial intelligence, where the updated neural network can be used for classification, segmentation, detection, etc., which are described in more detail in the following embodiments. It should be noted that although the following embodiments are described in a classification task scenario in an image recognition scenario, the application scenarios of the present disclosure are not limited thereto and can also be applied to any appropriate scenario, for example, speech recognition, segmentation (for example, semantic segmentation), detection (for example, object detection), etc. Moreover, the input data of the neural network of the present disclosure includes at least one of an image (for example, a handwritten image or a character image, etc.), audio/speech and text.

In the one or more embodiments, a neural network may be a neural network model or a learning model; the updating can also be referred to as training (for example, updating a neural network can also be called training a neural network); and a neuron in a neural network may be referred to as a channel.

Differences of exemplary embodiments of the present application from the related art may include the following:

The initial neural network is trained in a sparsity promoting manner, which means that the network not only needs to achieve good performance for tasks, but also is encouraged to use as few neurons as possible. Therefore, the smallest part of the network capacity is used for current tasks, and the rest of the network capacity is retained for future tasks.

The active part of the network is fixed, which may be indispensable for old tasks. It can avoid the representation drift problem, which means that the representation on the active neurons will not drift no matter how many new tasks are incorporated.

The inactive part of the network is reactivated, and the network can learn new information useful for new tasks.

If a certain layer reaches its capacity upper bound (also called the capability upper bound), the layer can be expanded to increase the network capacity.

Moreover, exemplary embodiments of the present disclosure may achieve at least one of the following advantages:

There is no problem of representation drift.

Almost no additional storage space is required to save the entire model (neural network).

The network can grow adaptively (or optimize the model size).

Even if the network needs to be expanded, the network size will not increase linearly with respect to the number of new tasks.

The network capacity can be better utilized.

Figure 11:
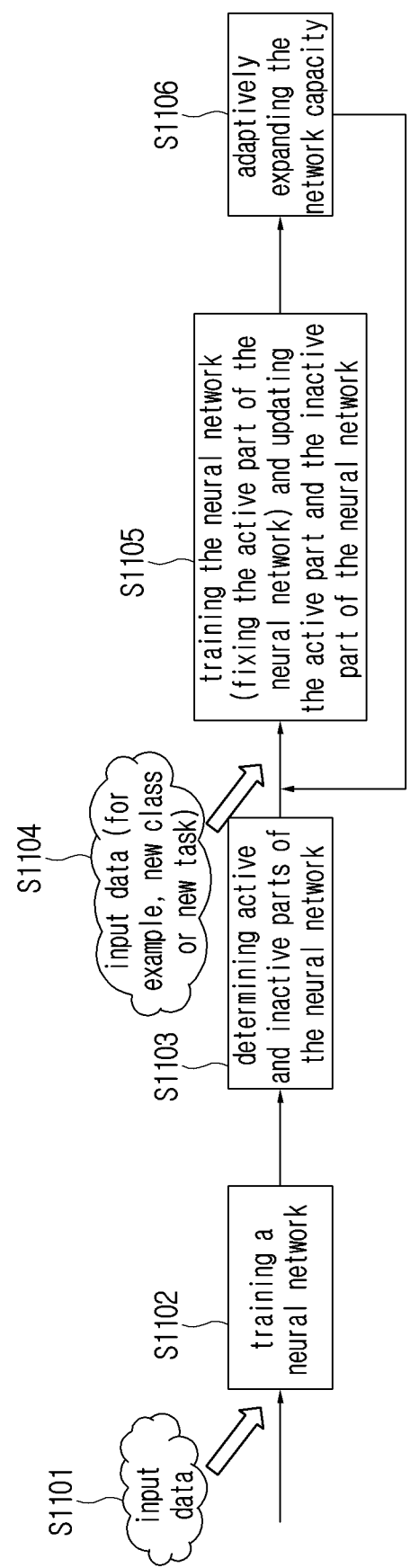
FIG. 11 is a flowchart showing a neural network update method according to an embodiment.

As an example, FIG. 11 is a flowchart of a neural network update method according to an embodiment. An initial neural network is trained in a sparsely promoting manner according to input data (S1101-S1102), and active and inactive parts (that is, the activation state of each neuron, and the activation state includes active and inactive) of the neural network are determined (S1103). When there are new classes or new tasks (S1104), the neural network needs to be continuously updated. At this time, the neural network can be trained according to the input data, and the active part and the inactive part of the neural network are updated (that is, the activation state of each neuron is updated) (S1105). When training the neural network, it is possible to fix the active part of the network to avoid the representation drift problem and also to reactivate the inactive part of the network (if a neuron determined to be inactive in the previous training result is reactivated, it can be trained). The network can learn new information useful for new tasks. When a certain layer reaches its capacity upper bound (also referred to as "capability upper bound"), the layer can also be expanded adaptively to increase the network capacity (S1106).

The embodiments of the present disclosure can better avoid the impact of updates for new tasks on the performance of the neural network in completing previous tasks. When the input data distribution of the new task is quite different from the input data distribution of the previous task, the problem of "representation drift" will be more impactful. Therefore, the technical aspects according to the embodiments of the present disclosure are advantageous.

I. Traditional Neural Network Model

The first embodiment relates to a sparsity-promoting neural network model.

In the following equations, it is assumed that x indicates an input image sample of the neural network model. This example is illustrated by taking image samples as input data, but the one or more embodiments are not limited thereto. Also, y indicates the real image classification output by the input image sample x.

The loss function $\mathcal{L}$ of the sparsity-promoting neural network model is shown in Expression 1:

$$\mathcal{L} = -I(h_L, y) \quad (1)$$

Here, $h_l$ indicates the hidden variable of the l-th hidden layer of the neural network model, where l=1, 2, ..., L, L is a total number of hidden layers of the neural network model, and $h_L$ indicates the hidden variable of the last hidden layer; y indicates the real image classification output by the input image sample x; $I(h_L, y)$ indicates the mutual information between two variables $h_L$ and y. The value of the mutual information being larger means that $h_L$ includes more information of y, while the mutual information being smaller means that $h_L$ includes less information of y.

The training objective of the sparsity-promoting network model is to minimize the loss function $\mathcal{L}$. Specifically, the minimization of the loss function $\mathcal{L}$ includes making the term $I(h_L, y)$ as large as possible, that is, making the mutual information $I(h_L, y)$ between the hidden variable $h_L$ of the last hidden layer of the network and the real classification label y of the input image data as large as possible, thereby making the probability of the neural network outputting the real classification label y as high as possible and the classification accuracy of the neural network as high as possible.

II. (a) Improved Sparsity-Promoting Network Model

The second embodiment relates to improving sparsity-promoting network model.

It is assumed that x indicates an input image sample of the neural network model, and y indicates the real image classification output by the input image sample x. The loss function $\mathcal{L}$ of the improved sparsity-promoting neural network model is shown in Expression 2:

$$L = -I(h_L, y) + \gamma \Sigma_{l=1}^{L} I(h_l, h_{l-1}) \quad (2)$$

Here, $I(h_L, y)$ is an expectation term, $h_l$ indicates the hidden variable of the l-th hidden layer of the neural network model, where l=1, 2, ..., L, L is a total number of hidden layers of the neural network model, and $h_L$ indicates the hidden variable of the last hidden layer; y indicates the real image classification output by the input image sample x and the expectation term indicates the mutual information between two variables $h_L$ and y. The value of the mutual information being larger means that $h_L$ includes more information of y, while the mutual information being smaller means that $h_L$ includes less information of y.

$I(h_l, h_{l-1})$ is a regularization term used to promote sparsity, and the regularization term used to promote sparsity indicates the mutual information between the hidden variable $h_l$ of the l-th hidden layer and the hidden variable $h_{l-1}$ of the (l-1)-th hidden layer, and the value of the mutual information being larger means that the hidden variable $h_l$ of the l-th hidden layer includes more information about the hidden variable $h_{l-1}$ of the (l-1)-th hidden layer, while the mutual information being smaller means that the hidden variable $h_l$ of the l-th hidden layer contains less information about the hidden variable $h_{l-1}$ of the (l-1)-th hidden layer; $\gamma$ is an adjustable hyperparameter which can control the balance between the sparsity-promoting regularization term and the loss function $\mathcal{L}$.

The training objective of the improved sparsity-promoting network model is to minimize the loss function $\mathcal{L}$. Specifically, the minimization of the loss function $\mathcal{L}$ includes:

(1) making the term $I(h_L, y)$ as large as possible, that is, making the mutual information $I(h_L, y)$ between the hidden variable $h_L$ of the last hidden layer of the network and the real classification label y of the input image data as large as possible, thereby increasing the probability of the neural network outputting the real classification label y and increasing the classification accuracy of the neural network; and (2) making the regularization term $$\sum_{l=1}^{L} I(h_l, h_{l-1})$$

used to promote sparsity as small as possible, that is, making the information contained by the hidden variable $h_l$ of the l-th hidden layer of the network and the hidden variable $h_{l-1}$ of the (l−1)-th hidden layer each other as little as possible, so that each hidden layer of the neural network model extracts as little information as possible from the previous layer, which can be understood as extracting only the most useful information.

Expression 3 is a specific expression of the loss function $\mathcal{L}$ of the improved sparsity-promoting neural network model:

$$\mathcal{L} = -\mathbb{E}_{\{x,y\} \sim p_{gt}, h \sim p(h|x)}[\log q(y|h_L)] + \gamma \sum_{l=1}^{L} \sum_{c=1}^{C_l} \log\left(1 + \left(\frac{\mu_c^l}{\sigma_c^l}\right)^2\right) \quad (3)$$

The first term $\mathbb{E}_{\{x,y\} \sim p_{gt}, h \sim p(h|x)}(h|x)[\log q(y|h_L)]$ is an expectation term, and $q(y|h_L)$ indicates the probability of the neural network model outputting the real classification label y for the hidden variable $h_L$ of the given last hidden layer, and the expectation term aims to make the probability of the neural network outputting the real classification label y as high as possible, thereby improving the classification accuracy of the network. Specifically, the subscript $p_{gt}$ of the expectation term indicates a training set, $\{x,y\} \sim p_{gt}$ indicates that $\{x,y\}$ is randomly sampled from the training set $p_{gt}$; the subscript p(h|x) of the expectation term indicates the hidden variable distribution of all of hidden layers after the input image sample x is given, the hidden variable distribution can be further decomposed into $p(h_1|x)p(h_2|h_1) \ldots p(h_l|h_{l-1})$, and the subscript h~p(h|x) of the expectation term indicates that h is randomly sampled from the hidden variable distribution, where each term in the hidden variable distribution indicates that the distribution of the hidden variable in a hidden layer should obey after the previous layer of the hidden layer is given, and each term in the hidden variable distribution is configured by the corresponding hidden layer respectively. For example, $p(h_1|x)$ indicates that the distribution the hidden variable $h_1$ of the first hidden layer should obey after the input image sample x is given, $p(h_2|h_1)$ indicates that the distribution the hidden variable $h_2$ of the second hidden layer should obey after the first hidden layer $h_1$ is given, and other terms can be deduced by analogy. In the procedure of actual operation, if there are N samples and K classifications, the one-hot code of the n-th sample is denoted as $y^{(n)}$, the k-th element thereof is $y_k^{(n)}$ which is 0 or 1, and the result output via the network is denoted as $\hat{y}_k^{(n)}$, then the first term can be further written as $$\frac{1}{N}\sum_{n=1}^{N}\sum_{k=1}^{K} -y_k^{(n)} \log \hat{y}_k^{(n)}.$$

The second term $$\gamma \sum_{l=1}^{L} \sum_{c=1}^{C_l} \log\left(1 + \left(\frac{\mu_c^l}{\sigma_c^l}\right)^2\right)$$

is a regularization term used to promote sparsity, each summation term in the sparsity-promoting regularization term, that is, $$\log\left(1 + \left(\frac{\mu_c^l}{\sigma_c^l}\right)^2\right),$$

corresponds to the information about the previous layer encoded in the c-th channel of the l-th hidden layer, L is the total number of hidden layers of the neural network model, $C_l$, which indicates the number of channels of the l-th hidden layer, the information bottleneck of the c-th channel of the l-th hidden layer is $(\mu_c^l, \sigma_c^l)$, that is, $\mu_c^l$ and $\sigma_c^l$ are parameters of the information bottleneck of the c-th channel of the l-th hidden layer and are trainable parameters, $\mu_c^l$ and $\sigma_c^l$ are optimized by backpropagation, all trainable parameters (including weight connection, $\mu$, $\sigma$) can receive the gradient of the loss function by back propagation, and all or some of these parameters may be optimized to the best values. As understood by those skilled in the art, $\mu_l^c$ and $\sigma_l^c$ may also indicate parameters of the information bottleneck of the c-th channel of the l-th hidden layer, and have the same value or meanings as $\mu_c^l$ and $\sigma_c^l$.

$$\log\left(1 + \left(\frac{\mu_c^l}{\sigma_c^l}\right)^2\right)$$

represents an amount of information corresponding to the information bottleneck of the c-th channel of the l-th hidden layer. It can be seen from $$\log\left(1 + \left(\frac{\mu_c^l}{\sigma_c^l}\right)^2\right)$$

that the loss function when training the neural network includes: the accumulation of the amount of information corresponding to the information bottleneck of each neuron in the hidden layer. In the one or more embodiments, a channel can also be referred to as a neuron, that is, the terms "channel" and "neuron" may be used interchangeably. If $$\log\left(1 + \left(\frac{\mu_c^l}{\sigma_c^l}\right)^2\right)$$

is equal to 0, it means that the channel does not encode any information about the previous layer, and the channel is useless for the training phase of the current task. Thus, there is no need to activate the channel in the current task, and it can be reserved to be used for subsequent tasks; if $$\log\left(1+\left(\frac{\mu_c^l}{\sigma_c^l}\right)^2\right)$$

is larger, then the channel encodes more information about the previous layer, and the channel is helpful for the training phase for the current task, so it needs to be activated in the training phase of the current task. For example, the loss function when training the neural network includes: the accumulation of the amount of information corresponding to the information bottleneck of each neuron in the hidden layer.

$\mu_c^l$ and $\sigma_c^l$ are two optimizable parameters. These two parameters are used to define each term in the hidden variable distribution $p(h_1|x)p(h_2|h_1) \ldots p(h_l|h_{l-1})$, for example, the specific expression of $p(h_2|h_1)$ is shown in Expression 4:

$$p(h_l^{i,j,c}|h_{l-1}) = \mathcal{N}(\mu_l^c \cdot f_l^{i,j,c}(h_{l-1}), (\sigma_l^c \cdot f_l^{i,j,c}(h_{l-1}))^2) \quad (4)$$

The hidden variable $h_l$ of the l-th hidden layer is a tensor with dimension $H_l \times W_l \times C_l$, where $H_l$ indicates a height of the l-th hidden layer, $W_l$ indicates a width of the l-th hidden layer, and $C_l$ indicates the number of channels of the l-th hidden layer. Moreover, the superscripts i,j, c of $h_l^{i,j,c}$ indicate the three dimensions of the hidden variable $h_1$ of the l-th hidden layer respectively.

$\mathcal{N}(\cdot,\cdot)$ indicates a Gaussian distribution, and $f_l^{i,j,c}(\cdot)$ is a learnable function. The function $f_l^{i,j,c}(\cdot)$ receives the hidden variable $h_{l-1}$ of the (l−1)-th hidden layer and provides a fixed scalar. Generally speaking, the function $f_l^{i,j,c}(\cdot)$ is configured by each layer of the neural network respectively.

In the procedure of actual operation, a sampling may not be directly performed according to Expression 4 to obtain $h_l^{i,j,c}$, but may first perform sampling based on the standard Gaussian distribution to get a random variable $\epsilon_l^{i,j,c}$ which may be a random perturbation and can introduce random noise, and then obtain $h_l^{i,j,c}$ by the following Expression 5:

$$h_l^{i,j,c} = f_l^{i,j,c}(h_{l-1}) \cdot (\mu_l^c + \sigma_l^c \cdot \epsilon_l^{i,j,c}) \quad (5)$$

This operation is equivalent to making $f_l^{i,j,c}(h_{l-1})$ go through an information bottleneck defined by $\mu_l^c$ and $\sigma_c^l$.

In the procedure of optimizing $\mu_c^l$ and $\sigma_c^l$, the parameters in $f_l^{i,j,c}(\cdot)$ will be optimized together with $\mu_c^l, \sigma_c^l$. Therefore, after the optimization operation, not only the optimized $f_l^{i,j,c}(\cdot)$ can be obtained, but also whether the c-th channel of the l-th hidden layer is involved in and the degree of involvement in the encoding for the information of the previous layer can be automatically learned by comparing $$\log\left(1+\left(\frac{\mu_c^l}{\sigma_c^l}\right)^2\right)$$

with a threshold.

The training objective of the improved sparsity-promoting network model is to minimize the loss function $\mathcal{L}$. Specifically, the minimization of the loss function $\mathcal{L}$ includes:

(1) making the expectation term $\mathbb{E}_{\{x,y\} \sim p_{gt}, h \sim p}(h|x)[\log q(y|h_L)]$ as large as possible, that is to say, making the mutual information $I(h_L, y)$ between the hidden variable $h_L$ of the last hidden layer of the network and the real classification label y of the input image data as large as possible, thereby making the probability of the neural network outputting the real classification label y as high as possible and the classification accuracy of the neural network as high as possible;

(2) making the regularization term $$\sum_{l=1}^{L}\sum_{c=1}^{C_l}\log\left(1+\left(\frac{\mu_c^l}{\sigma_c^l}\right)^2\right)$$

for promoting sparsity as small as possible, so that the channel regularization term $$\log\left(1+\left(\frac{\mu_c^l}{\sigma_c^l}\right)^2\right)$$

of the c-th channel of the l-th hidden layer is as close as possible to 0, that is, there will be as many channels, which are not involved in the encoding of the information of the previous layer in the training phase of the current task at all, thereby reducing the number of activated channels in the training phase of the current task. Accordingly, one or more channels may be reserved for the training phase of subsequent tasks.

The sparsity-promoting regularization term is the accumulation of the channel regularization term for each channel in the neural network model. By judging the channel regularization term of each channel, it can be determined whether to activate the channel in the training phase of the current task. In the present embodiment, the amount of information corresponding to the information bottleneck can be determined by the regularization term. For example, the amount of information corresponding to the information bottleneck is: the amount of information about the previous network layer encoded by the neuron.

Figure 12:
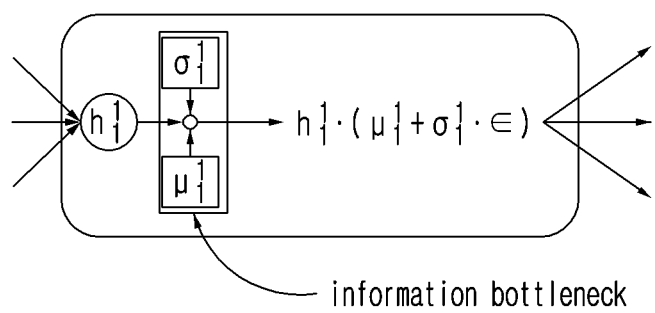
FIG. 12 is a diagram showing an information bottleneck according to an embodiment.

FIG. 12 a schematic diagram of the information bottleneck of the first neuron $h_1^1$ in the first hidden layer. $\mu_1^1$ and $\sigma_1^1$ are the parameters of the information bottleneck of $h_1^1$, $\varepsilon$ is the random perturbation, and the output of the information bottleneck can be $h_1^1 \cdot (\mu_1^1 + \sigma_1^1 \cdot \varepsilon)$. Theoretically speaking, if $\mu_1^1/\sigma_1^1 > 1$, then the corresponding neuron may be activated and encode more information. $\mu$ and $\sigma$ indicate how much information the corresponding neuron encodes. $\mu$ and $\sigma$ define a Gaussian distribution with mean equal to $h*\mu$ and variance equal to $h*\sigma$. $\mu$ can be regarded as a kind of signal, and $\sigma$ can be regarded as a kind of noise. If the signal is dominant, the neuron encodes useful information, and the neuron can be activated at this time. If the noise is dominant, the neuron will encode useless information, and the neuron cannot be activated at this time.

FIG. 1 shows a flowchart of an operation for determining channel activation/deactivation, in which the c-th channel of channels of the l-th hidden layer is taken as an example for illustration. In the present disclosure, a channel can also be referred to as a neuron, that is, the terms "channel" and "neuron" are used interchangeably.

In step S101, the channel regularization term $$\log\left(1+\left(\frac{\mu_c^l}{\sigma_c^l}\right)^2\right)$$

of the channel is compared with a threshold.

In step S102, when the channel regularization term $$\log\left(1 + \left(\frac{\mu_c^l}{\sigma_c^l}\right)^2\right)$$

is greater than or equal to the threshold, it is determined to activate the channel in the training phase of the current task.

In step S103, when the channel regularization term $$\log\left(1 + \left(\frac{\mu_c^l}{\sigma_c^l}\right)^2\right)$$

is less than the threshold, it is determined not to activate the channel in the training phase of the current task.

In an actual operation, if the channel regularization term $$\log\left(1 + \left(\frac{\mu_c^l}{\sigma_c^l}\right)^2\right)$$

is equal to 0, it means that the channel does not encode any information about the previous layer and does not need to be activated in the training phase for the current task. The channel regularization term $$\log\left(1 + \left(\frac{\mu_c^l}{\sigma_c^l}\right)^2\right)$$

may fail to be equal to 0 mathematically, and channels which are involved in the encoding of the information of the previous layer very little are also irrelevant for the training phase of the current task. Therefore, in an actual operation, we can choose to activate channels with $$\left(\frac{\mu_c^l}{\sigma_c^l}\right)^2 \geq 1$$

in the training phase of the current task, and consider the information encoded by channels with $$\left(\frac{\mu_c^l}{\sigma_c^l}\right)^2 < 1$$

is too little, so it is not activated in the training phase of the current task and is reserved to be used for the training phase of subsequent tasks. It should be noted that the condition for choosing whether to activate a channel can be any threshold. Here, the threshold of $$\left(\frac{\mu_c^l}{\sigma_c^l}\right)^2$$

is just defined as 1, for example.

Using the above improved sparsity-promoting network model can make the network use the least number of activated neurons to achieve the same classification accuracy. In learning of subsequent tasks, on the one hand, the activated neurons can be fixed so that the representation of these neurons no longer changes, thereby solving the problem of "representation drift"; on the other hand, neurons that have not yet been activated in the previous task can also be reactivated to learn extra features of a new task, so that a better accuracy is also achieved on the new task. If it is determined that all neurons in certain layers have been activated at the end of a certain training phase, so that no extra neurons can be involved in learning potential new features, then the network of such layer may be expanded to add some extra inactive neurons.

Figure 10A:
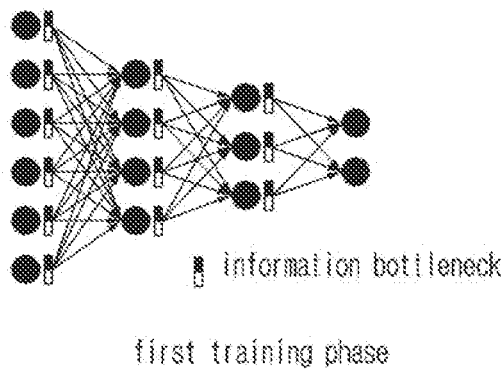
FIGS. 10A to 10D are schematic diagrams showing a network state during a training procedure according to embodiments.
Figure 10C:
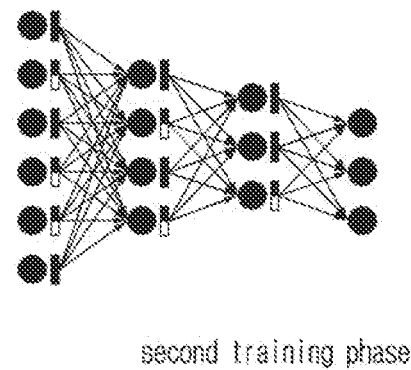
Figure 10B:
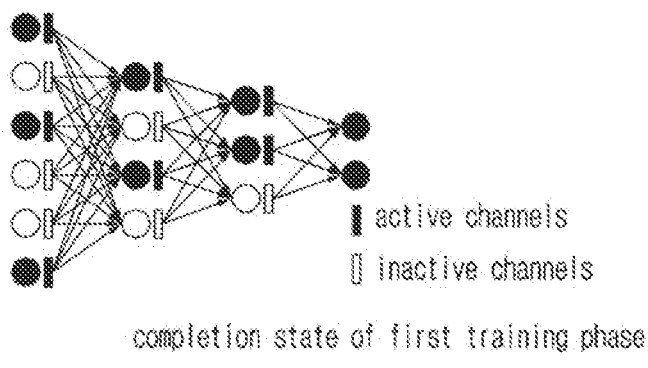
Figure 10D:
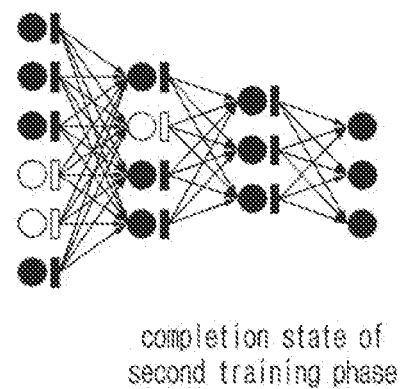

The improved sparsity-promoting network model may be divided into two scenarios for single-head learning and multi-head learning. In both cases, a complete training procedure is shown in FIG. 9. First, a first batch of data may be obtained (S901), and use the obtained first batch of data to train a sparse network (S902). The network state in the training procedure (e.g., first training phase) is shown in FIG. 10A. Each channel corresponds to an information bottleneck, and the information bottleneck is involved in training. After the end of training, whether to activate the channel is decided according to the parameters of the information bottleneck (S903). A typical training completion state is shown in FIG. 10B. In an embodiment, for an inactive neuron in at least one hidden layer, the corresponding information bottleneck is set to a preset value, for example, for (μ, σ) of the information bottleneck, setting the corresponding information bottleneck to the preset value can be setting μ to 1 and setting σ to 0. The neural network is trained based on the input data of the first batch; according to the information bottleneck of the trained inactive neuron, the activation state of the inactive neuron is determined, and channels with $$\left(\frac{\mu_c^l}{\sigma_c^l}\right)^2 \geq 1$$

are activated while channels with $$\left(\frac{\mu_c^l}{\sigma_c^l}\right)^2 < 1$$

are not activated. After acquiring new data (S904), if there is a need to re-train this part of the data, the sparse network may be re-trained by fixing the active channels and reactivating the inactive channels (S905). Another training phase (e.g., the second training phase) is shown in FIG. 10C. Here, channels that have been activated still remains active, while channels that are not activated previously may get involved in training and determine whether to be activated again after training is completed. For example, if the amount of information corresponding to the information bottleneck of an trained inactive neuron is greater than a preset threshold, the activation state of the inactive neuron is determined to be active. If the amount of information corresponding to the information bottleneck of the trained inactive neuron is not greater than a preset threshold, the activation state of the inactive neuron is determined to be inactive. A typical training completion state is shown in FIG. 10D. After this phase of training is completed, if necessary, a part of layers of the network can be chosen to be expanded to open up new space (S906). By repeating the above-described operations, the network model may learn new features constantly without forgetting old ones. In the embodiment of the present disclosure, the network uses the information bottleneck to train the network so that the network becomes sparse after training.

In the algorithm of the present disclosure, there is an information bottleneck in the training procedure. The information bottleneck has a random variable c which introduces random noise. The random noise is added during training, and the random perturbation can be regarded as a type of data augmentation to mitigate the overfitting issue.

On the contrary, for example, in the conventional adaptive network, there is no information bottleneck involved. Therefore, it suffers more from the overfitting issue, resulting in relatively poor performance.

II. (b) the Expansion of a Sparsity-Promoting Network Model

Figure 8A:
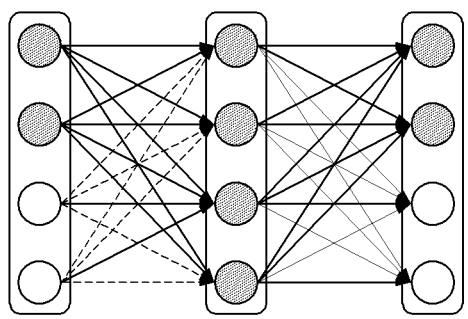
FIG. 8A and FIG. 8B are schematic diagrams showing expansion of the network capacity according to an embodiment.
Figure 8B:
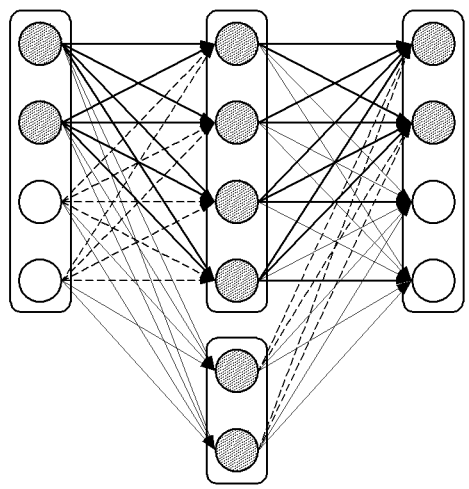

In the present disclosure, a channel can also be referred to as a neuron, that is, the terms "channel" and "neuron" are used interchangeably. In the one or more embodiments, whether to add neurons in the hidden layer can be determined based on the activation states of the neurons in the hidden layer in the neural network. In some cases, all neurons in a certain layer are activated, at this time, there is no extra inactive neuron that can encode potential new information for subsequent tasks, as shown in the second network layer in FIG. 8A. In such a situation, the layer can be added with extra new neurons to expand its capacity to a capacity upper bound. For example, when the neurons in the hidden layer in the neural network are all in an active state, a set number of inactive neurons are added to the hidden layer. As shown in FIG. 8B, two neurons are added to a second network layer, where the above-mentioned preset number can be a fixed value or a variable number.

I. (c) Application of an Improved Sparsity-Promoting Network Model

I. (c.1) Application of an Improved Sparsity-Promoting Network Model in Multi-Head Learning In a multi-head learning scenario, the above-mentioned improved sparsity-promoting network model solves the "representation drift" issue in three situations.

Figure 2:
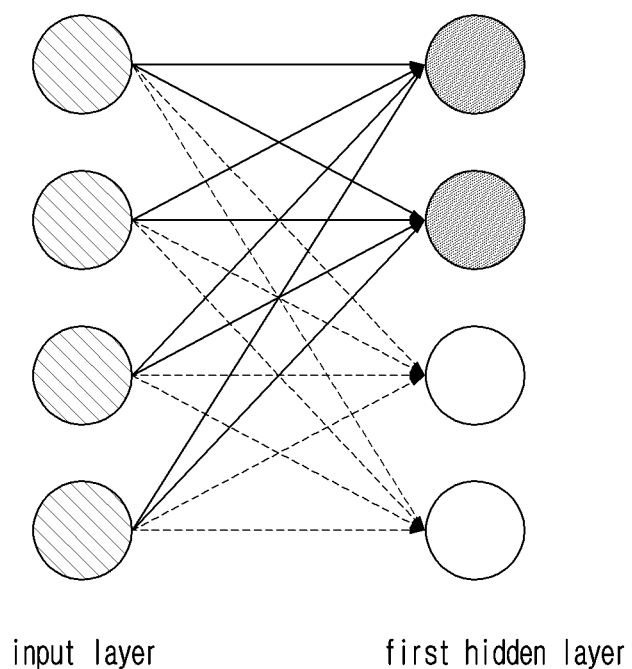
FIG. 2 is a diagram illustrating an input layer and a first hidden layer in multi-head learning and single-head learning according to an embodiment.

First, an input layer and a first hidden layer are shown in FIG. 2.

Here, it is assumed that, in the training phase for the current task, the first two channels in the first hidden layer are active channels while the last two channels are inactive channels.

For the active channels in the first hidden layer, they are configured to receive information of channel variables of all channels of the input layer from all the channels of the input layer. Based on the information and current connection parameters (weights) for the connections between the active channels in the first hidden layer and all the channels of the input layer, connection parameters are updated and the updated connection parameters are generated to complete the training phase of the current task. Furthermore, in the training phase of the subsequent task, the updated connection parameters remain unchanged. In an embodiment, the connections between the active neurons in the first hidden layer and each neuron in the previous network layer remain unchanged in the training procedure.

For the inactive channels in the first hidden layer, they are configured to receive information of channel variables of all channels of the input layer from all the channels of the input layer. Based on the information and current connection parameters for the connections between the inactive channels in the first hidden layer and all the channels of the input layer, connection parameters are updated, and the updated connection parameters are generated. Furthermore, in the training phase of the subsequent task, the updated connection parameters are initialized so as to continue to be updated in the training phase of the subsequent task. In an embodiment, the connections between the inactive neurons in the first hidden layer and each neuron of the previous network layer are trainable in the training procedure.

In FIG. 2, the channel parameters that remain unchanged in the subsequent training phase are shown in solid lines; the channel parameters to be initialized in the subsequent training phase are shown in dashed lines.

Figure 3:
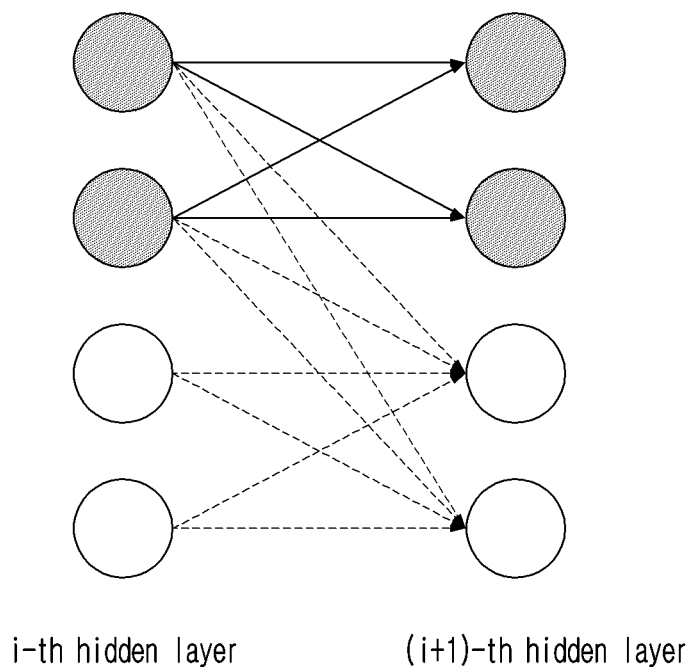
FIG. 3 is a diagram illustrating two hidden layers in multi-head learning and single-head learning according to an embodiment.

FIG. 3 shows two exemplary hidden layers according to an embodiment.

It is assumed that, in the training phase for the current task, the first two channels in the i-th hidden layer are active channels while the last two channels are inactive channels; the first two channels in the (i+1)-th hidden layer are active channels while the last two channels are inactive channels.

For the active channels of the (i+1)-th hidden layer, they are configured to receive the information indicating the channel variables of the active channels of the i-th hidden layer from the active channels of the i-th hidden layer. Based on the information and the current connection parameters for the connections between the active channels of the (i+1)-th hidden layer and the active channels of the i-th hidden layer, the updated connection parameters are generated to complete the training phase of the current task. In the training phase of the subsequent task, the updated connection parameters maintain unchanged. Furthermore, the connection parameters for the connections between the active channels of the (i+1)-th hidden layer and the inactive channels of the i-th hidden layer are set to 0 and are fixed to 0 in the training phase of the subsequent task. In an embodiment, the connections between the active neurons in other hidden layers than the first layer and the active neurons in the previous network layer remain unchanged during the training procedure. The connections between the active neurons in other hidden layers than the first layer and the inactive neurons in the previous network layer are 0, and remain unchanged during the training procedure.

For the inactive channels of the (i+1)-th hidden layer, they are configured to receive the information for indicating the channel variables of all channels of the i-th hidden layer from all the channels of the i-th hidden layer. Based on the information and current connection parameters for the connections between the inactive channels of the (i+1)-th hidden layer and all the channels of the i-th hidden layer, updated connection parameters are generated. Furthermore, in the training phase of the subsequent task, the connection parameters will be initialized so as to continue to be updated in the training phase of the subsequent task. In an embodiment, the connections between the inactive neurons in other hidden layers than the first layer and each neuron of the previous network layer are trainable in the training procedure.

In FIG. 3, the channel parameters that remain unchanged in the subsequent training phase are shown in solid lines; the channel parameters that will be initialized in the subsequent training phase are shown in dashed lines.

Figure 4A:
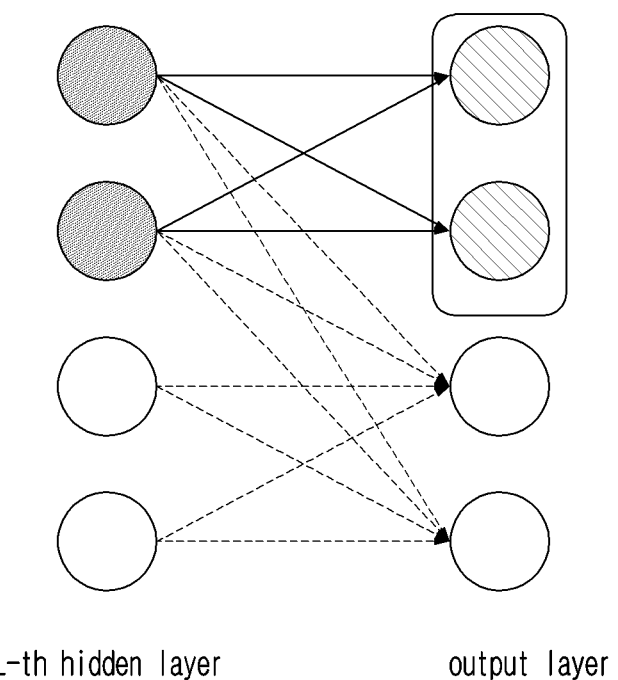
FIG. 4A is a diagram illustrating a last hidden layer and an output layer in a multi-head learning scenario according to an embodiment.
Figure 4B:
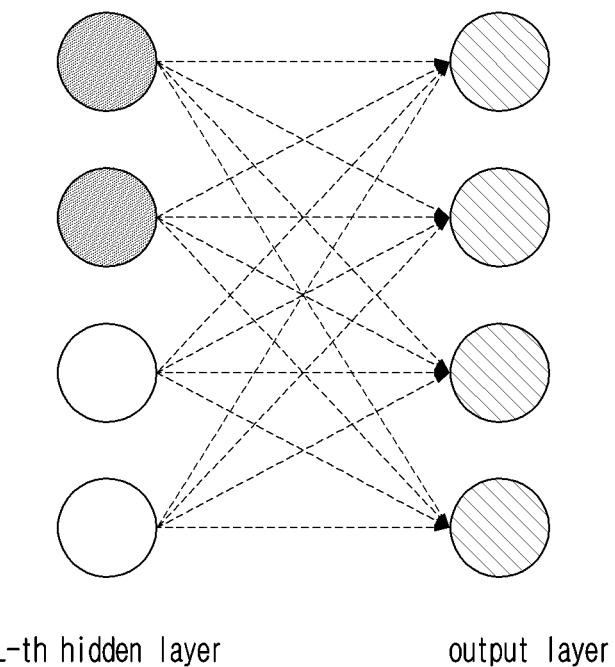
FIG. 4B is a diagram illustrating a last hidden layer and an output layer in a single-head learning scenario according to an embodiment.

FIGS. 4A and 4B show an L-th hidden layer and an output layer. Here, it is assumed that L is the total number of hidden layers of the neural network model, that is, the L-th hidden layer is the last hidden layer. In multi-head learning, each task corresponds to a specific output layer channel. In FIG. 4A, the output layer channels used for the training phase of the current task are circled in the form of a box.

For the channels used for the training phase of the current task in the output layer, they are configured to receive the information for indicating the channel variables of the active channels of the L-th hidden layer from the active channels of the L-th hidden layer. Based on the information and the current connection parameters for the connections between the channels used for the current task in the output layer and the active channels of the L-th hidden layer, the updated connection parameters are generated to complete the training phase of the current task. In the training phase of the subsequent task, the updated connection parameters remain unchanged. Furthermore, the connection parameters for the connections between the channels used for the current task in the output layer and the inactive channels of the L-th hidden layer are set to 0 and are fixed to 0 in the training phase of the subsequent task. In an embodiment, if the output layer is a multi-head output layer, the connections between the active neurons in the output layer and the active neurons in the previous network layer remain unchanged in the training procedure; the connections between the active neurons in the output layer and the inactive neurons in the previous network layer are 0 and remain unchanged in the training procedure; the connections between the inactive neurons in the output layer and each neuron in the previous network layer are trainable in the training procedure. Here, the multi-head output layer means an output layer to which at least one new output neuron that does not interact with an existing output neuron during the learning process is added.

In FIG. 4A, the parameters that remain unchanged in the subsequent training phase are shown in solid lines, and the channel parameters to be initialized in the subsequent training phase are shown in dashed lines.

It should be noted that the active channels in the network layer in the above description are only exemplary, and not should not be construed as limitations to the scope of the one or more embodiments of the disclosure.

I. (c.2) Application of an Improved Sparsity-Promoting Network Model in Single-Head Learning In a single-head learning scenario, the above-mentioned improved sparsity-promoting network model solves the "representation drift" issue in three cases.

Here, a design of an input layer to a first hidden layer is the same as the design in the multi-head learning scenario shown in FIG. 2, and will not be repeated here.

Also, a design of two hidden layers is the same as the design in the multi-head learning scenario shown in FIG. 3, and will not be repeated here.

Further, a design of a L-th hidden layer and an output layer is shown in FIG. 4B. It is assumed that L is the total number of hidden layers of the neural network model, that is, the L-th hidden layer is the last hidden layer. In single-head learning, all tasks use the same output layer structure, that is, use all channels of the output layer.

For all the channels in the output layer, they are configured to receive the information for indicating channel variables of all channels of the L-th hidden layer from all the channels of the L-th hidden layer. Based on the information and the connections between all the channels in the output layer and all the channels in the L-th hidden layer, updated connection parameters are generated. In the training phase of the subsequent task, the updated connection parameters will be initialized so as to continue to be updated in the training phase of the subsequent task. In an embodiment, if the output layer is a single-head output layer, the connection between each neuron of the output layer and each neuron of the previous layer is trainable in the training procedure. Here, the single-head output layer means an output layer to which at least one new output neuron interacting with an existing output neuron during the learning process is added. In the single-head case, there usually will be a softmax operation after the output layer. Therefore, there is interaction between the existing output neuron and the at least one new output neuron. Even some of the weights are fixed in the output layer, the representation in the output layer will be different.

As will be understood by those skilled in the art, the term "trainable" used in the present disclosure means that the connection parameters can be updated in the training procedure.

In single-head learning, although the channel variables of the channels of the output layer may change with task changes, for a certain task, the channel variables of the active channels of the L-th hidden layer are unchanged. Because of this, in single-head learning, the test phase does not directly use the output layer, but uses the L-th hidden layer. Specifically, after the training of a task is completed, the feature center of each class in the L-th hidden layer may be calculated and stored. In the test phase of the task, the feature value of a test input test sample in the L-th hidden layer and the distance of the feature value to the corresponding feature center of each class may be calculated, and the class with the closest distance to the feature center may be selected as a predicted classification output. In a single-head task, there may be a softmax layer that calculates the probability after the output layer. Therefore, the neurons in the output layer interact with each other, and even if the connection is fixed, the output representation will be different.

It should be noted that the active channels in the network layer in the above description are only exemplary, and should not be construed as limitations to the scope of the one or more embodiments.

II. (d) Improvement Effect of an Improved Sparsity-Promoting Network Model on Classification Accuracy In single-head learning and multi-head learning, the improved sparsity-promoting network model achieves higher classification accuracy than existing algorithms.

In the following, through comparison with existing algorithms, the improvement effect of the improved sparsity-promoting network model on the classification accuracy is explained.

First, the following existing algorithms are briefly introduced.

(1) Learning without Forgetting (LwF) model: This algorithm is mainly used for multi-head learning.

(2) Elastic Weight Consolidation (EWC) model: this algorithm can be used for multi-head output and single-head output.

(3) Progress & Compress (P&C) model: this algorithm is mainly used for multi-head output.

(4) Adaptive Network model: this algorithm is mainly used for multi-head output.

(5) Incremental Classifier and Representation Learning (iCaRL) model: this algorithm is mainly used for single-head output.

(6) SupportNet model: this algorithm is mainly used for single-head output.

II. (d.1) Multi-Head Learning Scenario

In order to show the advantage in classification accuracy of the improved sparsity-promoting network model in multi-head learning scenarios, it will be compared with "the Learning without Forgetting model", "the Elastic Weight Consolidation model" and "the Progress and Compress model" by using a public dataset in the following.

Table 1-1 shows the comparison of the average classification accuracy, on the public dataset OMNIGLOT, of the algorithm proposed by the present disclosure, the Learning without Forgetting model, the Elastic Weight Consolidation model and the Progress and Compress model for all 50 characters in OMNIGLOT:

TABLE 1-1

| Algorithm name | Final classification accuracy |
| --- | --- |
| Learning without Forgetting model | 62.1% |
| Elastic Weight Consolidation model | 67.3% |
| Progress & Compress model | 70.3% |
| Adaptive Network | 72.0% |
| The algorithm proposed by the present disclosure | 80.8% |

It can be seen that, in a multi-head learning scenario, the improved sparsity-promoting network model can provide higher classification accuracy than the existing algorithms (e.g., the Learning without Forgetting model, the Elastic Weight Consolidation model and the Progress and Compress model).

Specifically, the OMNIGLOT dataset contains 50 different alphabets, each containing 20 to 50 characters, each of which contains multiple handwritten pictures completed by multiple people.

First, the improved sparsity-promoting network model may acquire all the data of the first alphabet, and treat the first alphabet as an input image sample to perform training. After the completion of the first training phase, not only a model that can perform classification on the first alphabet is obtained, but also only part of the channels in each hidden layer of the model are activated, and the other inactive channels are reserved to be used for the training of subsequent alphabets. The channel parameters of the active channels in the training of the first alphabet may remain unchanged in the subsequent training.

The improved sparsity-promoting network model may acquire all the data of the second alphabet, and treat the second alphabet as an input image sample to perform training. After the completion of the second training phase, the model can perform classification on the second alphabet, while the classification accuracy on the first alphabet remains the same. Considering that the classification task of the second alphabet requires the model to learn some new features, the number of active channels in each hidden layer of the model will increase compared with that of the training for the first alphabet.

By repeating such a procedure, a model that is trained with relatively high classification accuracy for all the 50 alphabets may be obtained.

The improved sparsity-promoting network model enables the model to maintain its classification accuracy on the previously trained alphabet in the model training procedure of subsequent alphabets, thereby providing higher classification accuracy than existing algorithms.

In addition, none of the other algorithms, other than the present disclosure and the Adaptive Network, have a mechanism in which network nodes can be automatically increased. Comparing the embodiments of the present disclosure with the Adaptive Network, the embodiments of the disclosure only need to increase network nodes in 25% of cases, while the Adaptive Network requires to increase network nodes in all cases. That is, the one or more embodiments of the present disclosure use fewer neurons to obtain higher classification accuracy, thereby increasing the efficiency of utilizing resources.

Table 1-2 shows the comparison of the average classification accuracy, on the public dataset split-Modified National Institute Standards and Technology (MNIST), of the algorithm of the present disclosure, the Elastic Weight Consolidation model, the Activation Regularization model and the Adaptive Network for all 5 tasks in split-MNIST:

TABLE 1-2

| Algorithm name | Average classification accuracy |
| --- | --- |
| Elastic Weight Consolidation model | 63.1% |
| Activation Regularization model | 98.9% |
| Adaptive Network | 97.4% |
| The algorithm proposed by the present disclosure | 99.8% |

It should be noted that the algorithm of the one or more embodiments of the present disclosure has better effects than the Adaptive Network. This is mainly because the information bottleneck introduced by the present disclosure actually plays a role of regularization similar to random deactivation, thereby improving the generalization ability of the model.

II. (d.2) Single-Head Learning Scenario

In order to show the advantage in classification accuracy of the improved sparsity-promoting network model in single-head learning scenarios, it will be compared with the Elastic Weight Consolidation model, the incremental Classifier and Representation Learning model and the SupportNet model by using a public dataset in the following.

Table 2 shows the comparison, based on the public dataset MNIST, of the algorithm of the one or more embodiments of the disclosure, the Elastic Weight Consolidation model, the incremental Classifier and Representation Learning model and the SupportNet model for the final classification accuracy got after the completion of training of all tasks (in this test, each algorithm uses the same storage space size, that is, the storage space that can store a total of 200 pictures):

TABLE 2

| Algorithm name | Final classification accuracy |
| --- | --- |
| Elastic Weight Consolidation model | 75.5% |
| Incremental Classifier and Representation Learning model | 91.1% |
| SupportNet model | 69.5% |
| The algorithm proposed by the present disclosure | 95.8% |

For applications of handwritten digit recognition, a classification accuracy of 95% is the accuracy requirement that a good handwritten digit recognition algorithm should meet. Comparing the algorithm of the one or more embodiments of the disclosure with the existing algorithms, only the algorithm of the one or more embodiments achieve the classification accuracy of 95% as shown in Table 2 above.

Specifically, the MNIST dataset contains handwritten digit pictures completed by multiple people. Each picture is black and white, and corresponds to a digit from 0 to 9. We divide these digits into 5 different batches, that is, 0 and 1 are the first batch, 2 and 3 are the second batch, and so on.

First, the improved sparsity-promoting network model acquires all the data of the first batch, that is, all pictures corresponding to 0 and 1, and takes the first batch as input image samples to perform training. After the training is completed, for any test picture, the model can judge whether it is 0 or 1. Moreover, only a part of channels of each hidden layer of the model are activated, and other inactive channels are reserved to be used for training of subsequent batches. After the training of the first batch is completed, a part of picture samples of 0 and 1 in the first batch are randomly selected to be stored in the storage space.

Then, the improved sparsity-promoting network model acquires all the data of the second batch, that is, all pictures corresponding to 2 and 3, and takes the second batch and the part of the picture samples of 0 and 1 in the first batch previously stored in the storage space together as input image samples to perform training. The goal is to enable the model to classify these four classes of pictures of 0, 1, 2 and 3. After this round of training is completed, the number of active channels in each hidden layer of the model will increase compared with when only the training for the first batch is completed.

Then, some picture samples of 0 and 1 stored in the storage space are randomly emptied, freeing up storage space to store a part of picture samples of 2 and 3 in the second batch. By repeating such a procedure, a model for which the training is completed can be finally obtained, and the model can classify pictures corresponding to 0-9.

The improved sparsity-promoting network model enables the model to maintain its classification accuracy on the previously trained batch in the model training procedure of subsequent batches, thereby providing higher classification accuracy than existing algorithms.

Further, Table 3-1 shows the comparison, based on the public dataset CIFAR-10, of the algorithm of the one or more embodiments of the disclosure, the Elastic Weight Consolidation model, the incremental Classifier and Representation Learning model and the SupportNet model for the final classification accuracy got after the completion of training of all tasks:

TABLE 3-1

| Algorithm name | Final classification accuracy |
|---|---|
| Elastic Weight Consolidation model | 31.4% |
| Incremental Classifier and Representation Learning model | 64.9% |
| SupportNet model | 27.6% |
| The algorithm proposed by the present disclosure | 70.6% |

Specifically, the training set of CIFAR-10 includes 50,000 color pictures, and the test set includes 10,000 color pictures, including 10 different classes such as trucks, frogs, etc., and the number of pictures in each class is equal. Similarly, according to an embodiment, 10 classes are divided into 5 batches, that is, the first two classes are the first batch, the third and fourth classes are the second batch, and so on. The classification task training are performed on the compared models on 5 batches in turn (in this test, each algorithm uses the same storage space size, e.g., the storage space that can store a total of 200 pictures).

First, the improved sparsity-promoting network model acquires all the data of the first batch, that is, all pictures corresponding to the first two classes (e.g., airplanes and automobiles), and takes the first batch as input image samples to perform training. After the training is completed, for any test picture, the model can judge whether it is an airplane or an automobile. Moreover, only a part of channels of each hidden layer of the model are activated, and other inactive channels are reserved to be used for training of subsequent batches. After training of the first batch is completed, a part of the picture samples of airplanes and automobiles in the first batch are randomly selected to be stored in the storage space.

Then, the improved sparsity-promoting network model acquires all the data of the second batch, that is, all the pictures corresponding to the third and fourth classes (e.g., birds and cats), and takes the second batch and the part of the image samples of airplanes and automobiles in the first batch previously stored in the storage space together as input image samples to perform training. The goal is to enable the model to classify these four classes of pictures of airplanes, automobiles, birds and cats. After the second round of training is completed, the number of active channels in each hidden layer of the model will increase compared with that of when only the training for the first batch is completed.

Then, some picture samples of airplanes and automobiles stored in the storage space are randomly emptied, aiming to free up storage space to store a part of picture samples of birds and cats in the second batch. By repeating such a procedure, a model for which training is completed can finally be obtained, and the model can classify pictures corresponding to all the ten classes.

The improved sparsity-promoting network model enables the model to maintain its classification accuracy on the previously trained batch in the model training procedure of subsequent batches, thereby providing higher classification accuracy than existing algorithms.

For this task, the algorithm according to the one or more embodiments of the disclosure can achieve an accuracy of over 70%, and the classification accuracy is greatly improved compared to those of existing algorithms.

In addition, Table 3-2 shows the comparison, based on the public dataset CIFAR-100, of the algorithm according to the one or more embodiments of the disclosure, the Elastic Weight Consolidation model, the incremental Classifier and Representation Learning model and the SupportNet model for the final classification accuracy obtained after the completion of training of all tasks:

TABLE 3-2

| Algorithm name | Final classification accuracy |
|---|---|
| Elastic Weight Consolidation model | 9.8% |
| Incremental Classifier and Representation Learning model | 39.8% |
| SupportNet model | 8.7% |
| The algorithm proposed by the present disclosure | 41.6% |

Specifically, the training set of CIFAR-100 includes 50,000 color pictures, and the test set includes 10,000 color pictures which include 100 different classes, and the number of pictures in each class is the same. In this experiment, the 100 classes are divided into 10 batches, that is, the first ten classes are the first batch, the eleventh to the twentieth classes are the second batch, and so on. The classification task training are performed on the compared models on ten batches in turn (in this test, each algorithm also uses the same storage space size, that is, the storage space that can store a total of 200 pictures).

III. (a) Improved Sparsity-Promoting Network Model

In the improved sparsity-promoting network model described in II, what is used in the loss function $\mathcal{L}$ as shown in Expression 3 is the global hyperparameter $\gamma$. Therefore, when using this model, the sparsity ratio cannot be set in advance, but the value of $\gamma$ needs to be manually adjusted multiple times through experiments in the procedure of using.

In order to control the sparsity ratio more precisely, in the third embodiment, another improved sparsity-promoting network model is proposed.

Expression 6 shows a specific expression of the loss function $\mathcal{L}$ of the improved sparsity-promoting neural network model:

$$\mathcal{L} = -\mathbb{E}_{(x,y)\sim p_{gt}, h\sim p(h|x)}[\log q(y|h_L)] + \sum_{l=1}^{L}\sum_{c=1}^{C_l} \gamma_c^l \log\left(1 + \left(\frac{\mu_c^l}{\sigma_c^l}\right)^2\right) \quad (6)$$

The second term $$\sum_{l=1}^{L}\sum_{c=1}^{C_l} \gamma_c^l \log\left(1 + \left(\frac{\mu_c^l}{\sigma_c^l}\right)^2\right)$$

is a regularization term used to promote sparsity, and each summation term in the regularization terms promoting sparsity, that is, the channel regularization term $$\gamma_c^l \log\left(1 + \left(\frac{\mu_c^l}{\sigma_c^l}\right)^2\right),$$

corresponds to the information about the previous layer encoded in the c-th channel of the l-th hidden layer.

In Expression 6, the global hyperparameter $\gamma$ that needs to be manually adjusted is no longer used, but there is a corresponding local hyperparameter $\gamma_c^l$ for each neuron/feature map channel. The local hyperparameter $\gamma_c^l$ is adaptively adjusted according to the specific situation in the actual optimization.

The adaptive adjustment method of the local hyperparameter $\gamma_c^l$ is illustrated using the following exemplary method.

Before the training begins, the initialization value of $\gamma_c^l$ is set to a value 0 or close to 0, for example, $1\times10^{-10}$. That is, at the beginning phase of the training, the training objective of the loss function focuses on improving the classification accuracy, rather than compressing the model.

In the optimization procedure of the loss function $\mathcal{L}$ as shown in Expression 6 (for example, using the gradient descent method for optimization), $\gamma_l^l$ is periodically updated (for example, $\gamma_c^l$ is updated every 10 iterations). A specific update method is as follows.

Figure 7:
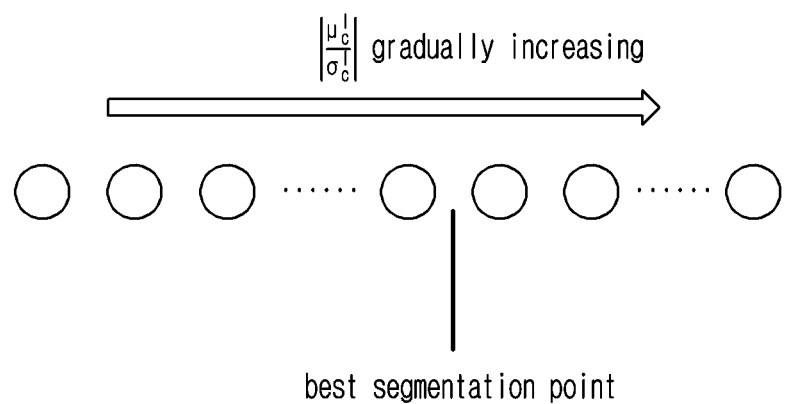
FIG. 7 is a schematic diagram illustrating a method of searching for the best segmentation point according to an embodiment.

As shown in FIG. 7, all of $$\left|\frac{\mu_c^l}{\sigma_c^l}\right|$$

are sorted from the smallest to largest, and the best segmentation point is searched from left to right. The best segmentation point is determined according to the target compression ratio, that is, in order to make the compression ratio equal to an ideal compression ratio or a predetermined compression ratio, the neuron/channel to the left of the best segmentation point should be deleted. It is assumed that the ideal mask value $b_c^l$ is used to indicate whether a certain neuron/feature map channel should be deleted to meet the ideal compression ratio. Specifically, when the current $$\left|\frac{\mu_c^l}{\sigma_c^l}\right|$$

is less than the threshold corresponding to the best segmentation point, the ideal mask value $b_c^l$ is set to 0 to indicate that the neuron/feature map channel is to the left of the best segmentation point, so it should be deleted to meet the ideal compression ratio; when the current $$\left|\frac{\mu_c^l}{\sigma_c^l}\right|$$

is greater than the threshold corresponding to the best segmentation point, the ideal mask value $b_c^l$ is set to 1 to indicate that the neuron/feature map channel is to the right of the best segmentation point and therefore should not be deleted.

In addition, it is assumed that the actual mask value $m_c^l$ is used to indicate whether a certain neuron/feature map channel has actually been deleted. Specifically, when the current $$\left|\frac{\mu_c^l}{\sigma_c^l}\right|$$

is less than a preset pruning threshold (for example, the pruning threshold is 1), the actual mask value $m_c^l$ is set 0 to indicate that the neuron/feature map channel has actually been deleted; when the current $$\left|\frac{\mu_c^l}{\sigma_c^l}\right|$$

is greater than the preset pruning threshold, the actual mask value $m_c^l$ is set to 1 to indicate that the neuron/feature map channel is not deleted.

Based on the above classification criteria, the values of $b_c^l$ and $m_c^l$, all neuron/feature map channels can be divided into the following four classes:

|  | $b_c^l = 0$ | $b_c^l = 1$ |
| --- | --- | --- |
| $m_c^l = 0$ | should be pruned, and has actually been pruned | should not be pruned, but has actually been pruned |
| $m_c^l = 1$ | should be pruned, but are not actually pruned | should not be pruned, and are not actually pruned |

In the following, for the above four classes of neuron/feature map channels, the tuning methods for the hyperparameter $\gamma_c^l$ corresponding to the neuron/feature map channel are respectively described.

When $b_c^l=0$ and $m_c^l=0$, no tuning is performed to the corresponding hyperparameter $\gamma_c^l$.

When $b_c^l=0$ and $m_c^l=1$, in order to restrict the neuron/feature map channel from encoding information, the corresponding hyperparameter $\gamma_c^l$ is tuned up to reinforce the corresponding channel regularization term in the loss function. In actual operation, for example, this operation may be implemented by multiplying the corresponding hyperparameter $\gamma_c^l$ by a coefficient greater than 1 (for example, 1.1).

When $b_c^l=1$ and $m_c^l=0$, the corresponding hyperparameter $\gamma_c^l$ is tuned down to weaken the corresponding channel regularization term in the loss function. In actual operation, for example, the corresponding hyperparameter $\gamma_c^l$ to the initialization value (for example, $1\times10^{-10}$) may be reset. Further, in order to accelerate the process of the neuron/feature map channel being re-involved in training, $\sigma_c^l$ is reset to the initial value, for example, 0.01.

When $b_c^l=1$ and $m_c^l=1$, in order to impel the neuron/feature map channel to further encode more information, its corresponding hyperparameter is tuned down to weaken its corresponding channel regularization term in the objective function. In actual operation, for example, the corresponding hyperparameter $\gamma_c^l$ may be multiplied by a coefficient less than 1 (for example, 0.9).

Further, in order to ensure the speed of tuning, a value range for each $\gamma_c^l$ may be set to, for example, the upper and lower bounds of $1\times10^{-3}$ and $1\times10^{-10}$, respectively. When $\gamma_c^l$ is greater than $1\times10^{-3}$ after being multiplied by 1.1, $\gamma_c^l$ is reset to $1\times10^{-3}$; when $\gamma_c^l$ is less than $1\times10^{-10}$ after being multiplied by 0.9, it is reset to $1\times10^{-10}$. The improved sparsity-promoting network model enables the result by training to better meet the preset sparsity ratio.

III. (b) the Performance of the Improved Sparsity-Promoting Network Model in Achieving the Preset Sparsity Ratio In the following, the CIFAR-10 dataset is taken as an example to illustrate the effect of a sparse network with a controllable compression ratio. The CIFAR-10 dataset is a dataset containing 50,000 training pictures and 10,000 test pictures. Each picture is a color picture with a side length of 32 pixels. These pictures come from 10 classes. The basic network model is selected as VGG16, which has 16 layers, including 13 convolutional layers and 3 fully connected layers. For the classification of CIFAR-10, the model has a lot of redundancy that can be compressed.

First, the classification task of CIFAR-10 is trained on VGG16. Then, the traditional information bottleneck network and the information bottleneck network with a controllable compression ratio are used respectively to compress the model. For the traditional information bottleneck network, different global hyperparameters $\gamma$ are applied. For the information bottleneck network with a controllable compression ratio according to the one or more embodiments, a channel-specific local hyperparameter $\gamma_c^l$ based on the adaptive adjustment of different preset compression ratios is applied. Then, the two models are compared with two dimensions of classification accuracy and compression ratio.

Table 4 shows the classification accuracy and compression ratio of the traditional information bottleneck network under different $\gamma$, and Table 5 shows the classification accuracy and compression ratio of the information bottleneck network with a controllable compression ratio of the present disclosure under different preset compression ratios.

TABLE 4

| $\gamma$ | Test accuracy | Compression ratio |
| --- | --- | --- |
| $2 \times 10^{-5}$ | 91.69% | 4.60% |
| $5 \times 10^{-5}$ | 91.40% | 3.54% |
| $1 \times 10^{-4}$ | 89.92% | 2.78% |

TABLE 5

| Preset compression ratio | Test accuracy | Compression ratio |
| --- | --- | --- |
| 4% | 91.15% | 4% |
| 3% | 91.04% | 3% |
| 2% | 90.43% | 2% |

It can be seen that the traditional information bottleneck network does not precisely control the compression ratio. However, after using the information bottleneck network with a controllable compression ratio according to the one or more embodiments, the actual compression ratio is completely consistent with the preset compression ratio, at the same time, it is ensured that the classification accuracy is also equivalent to that of the traditional information bottleneck network.

According to the method described above, a method for training a neural network model for image recognition can obtain output data for recognizing images or features in images by using image data as input data of an artificial intelligence model. The artificial intelligence model can be obtained through training. Here, "obtained through training" refers to training a basic artificial intelligence model with multiple pieces of training data through a training algorithm to obtain a predetermined operating rules or an artificial intelligence model configured to perform a desired feature. The artificial intelligence model can include multiple neural network layers. Each neural network layer of the multiple neural network layers includes multiple weight values, and the neural network calculation is performed by calculating between the calculation result of the previous layer and the multiple weight values.

Visual understanding is a technology that recognizes and processes things like human vision, including, for example, object recognition, object tracking, image retrieval, face recognition, scene recognition, 3D reconstruction/positioning or image enhancement.

Figure 5:
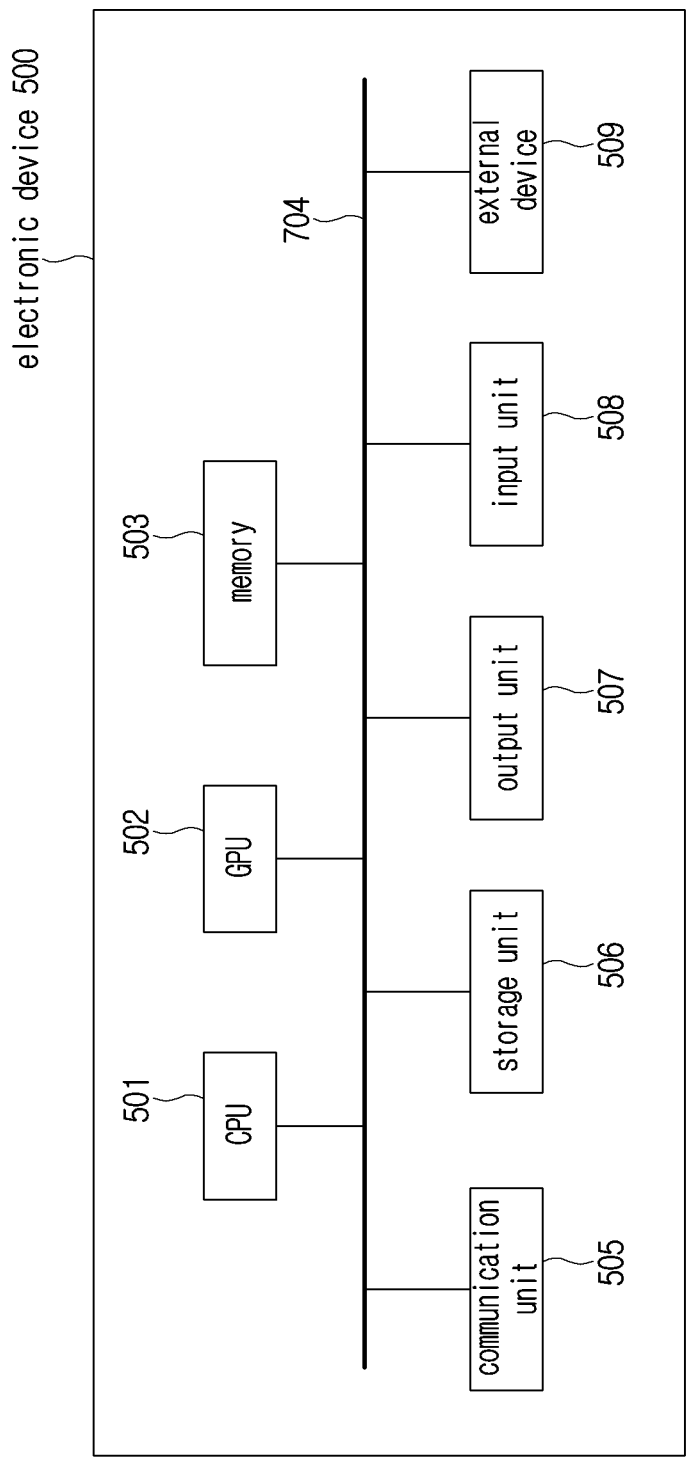
FIG. 5 is a block diagram illustrating an electronic device according to an embodiment.

FIG. 5 is a hardware block diagram illustrating an electronic device 500 according to an embodiment. An electronic device according to an embodiment includes at least a processor and a memory for storing computer program instructions. When the computer program instructions are loaded and executed by the processor, the processor performs the training method of a neural network model and the image processing method as described above.

The processor may include various processing circuitry and control the overall operation of the electronic device 500. The processor may be connected to each configuration of the electronic device 500 and control the overall operation of the electronic device 500.

Specifically, the electronic device 500 includes a Central Processing Unit (CPU) 501, a Graphics Processing Unit (GPU) 502 and a main memory 503. These units are connected to each other via a bus 704. The Central Processing Unit (CPU) 501 and/or the Graphics Processing Unit (GPU) 502 can function as the aforementioned processor, and the main memory 503 can function as the aforementioned memory storing computer program instructions. In addition, the electronic device 500 can further include a communication unit 505, a storage unit 506, an output unit 507, an input unit 508 and an external device 509, and these units are also connected to the bus 704.

Also, the processor may be implemented, for example, and without limitation, as a digital signal processor (DSP), a microprocessor, a time controller (TCON), or the like, but is not limited thereto. The processor may include, for example, and without limitation, one or more of a central processing unit (CPU), a dedicated processor, a micro controller unit (MCU), a micro processing unit (MPU), a controller, an application processor (AP), a communication processor (CP), an ARM processor, or the like, or may be defined by the corresponding term. In addition, the processor may be implemented as a System on Chip (SOC) or a large scale integration (LSI) embedded with a processing algorithm, and as a form of field programmable gate array (FPGA).

At least one of the multiple units can be realized by an AI model. AI-related functions can be performed by a non-volatile memory, a volatile memory and a processor.

The processor can include one or more processors. At this time, one or more processors can be general-purpose processors, such as a Central Processing Unit (CPU), an Application Processor (AP), or the like, a pure graphics processing unit, such as a Graphics Processing Unit (GPU), a Vision Processing Unit (VPU), and/or an artificial intelligence dedicated processor, such as a Neural Processing Unit (NPU).

One or more processors control the processing of input data according to a predefined operating rule or an Artificial Intelligence (AI) model stored in a non-volatile memory and a volatile memory. The predefined operating rule or the artificial intelligence model is provided by training or learning.

Here, the predefined operating rule or the AI model being provided by learning means that the predefined operating rule or the artificial intelligence model of desired features is obtained by applying learning algorithms to multiple pieces of learning data. The learning can be performed on the device itself in which the AI model according to the one or more embodiments is executed, and can be implemented by a separate server/system.

The AI model can include multiple neural network layers. Each layer has multiple weight values, and performs the layer operation through the operation of calculating the previous layer and multiple weights. Examples of neural networks include, but are not limited to, Convolutional Neural Networks (CNN), Deep Neural Networks (DNN), Recursive Neural Networks (RNN), Restricted Boltzmann Machines (RBM), Deep Belief Networks (DBN), Bidirectional Recursive Deep Neural Network (BRDNN), Generative Adversarial Network (GAN) and Deep Q Network.

A learning algorithm is a method of training a predetermined target device (for example, a robot) using a plurality of pieces of learning data to cause, allow or control the target device to make judgments or predictions. Examples of learning algorithms include, but are not limited to, supervised learning, unsupervised learning, semi-supervised learning or reinforcement learning.

The function related to artificial intelligence according to the disclosure may be operated through the processor and the memory.

The processor may include one or more processors. The one or more processors may be a general-purpose processor such as a CPU, an AP, and a DSP, a graphic dedicated processor such as a GPU and a vision processing unit (VPN), or an artificial intelligence dedicated processor such as an NPU.

The one or more processors may, based on pre-defined operation rules stored in the memory and the artificial intelligence model, control to process the input data. In addition, based on the one or more processors being an artificial intelligence dedicated processor, the artificial intelligence dedicated processor may be designed to a hardware structure specializing in processing a specific artificial intelligence model. The pre-defined operation rules or the artificial intelligence model may be characterized by being made through learning.

Being made through learning may refer to a pre-defined operation rule or artificial intelligence model being made to perform a desired characteristic (or object) as the basic artificial intelligence model is trained using a plurality of learning data by a learning algorithm. The learning may be carried out in the machine itself performing the artificial intelligence according to the disclosure, or through a separate server and/or system. Examples of learning algorithm include supervised learning, unsupervised learning, semi-supervised learning or reinforcement learning, but are not limited thereto.

The artificial intelligence model may include a plurality of neural network layers. Each of the plurality of neural network layers may have a plurality of weight values, and perform neural network processing through calculating the calculation result of the previous layer and the calculation between the plurality of weight values. The plurality of weight values held by the plurality of neural network layers may be optimized by the training result of the artificial intelligence model. For example, the plurality of weight values may be renewed for the loss value or the cost value obtained from the artificial intelligence model during the training process be reduced or optimized.

The artificial intelligence network may include a deep neural network (DNN), and a convolutional neural network (CNN), a deep neural network (DNN), a recurrent neural network (RNN), a Restricted Boltzmann Machine (RBM), a deep belief network (DBN), a bidirectional recurrent deep neural network (BRDNN), a generative adversarial network (GAN), a Deep Q-Networks, or the like, for example, may be included therein, but are not limited thereto.

Figure 6:
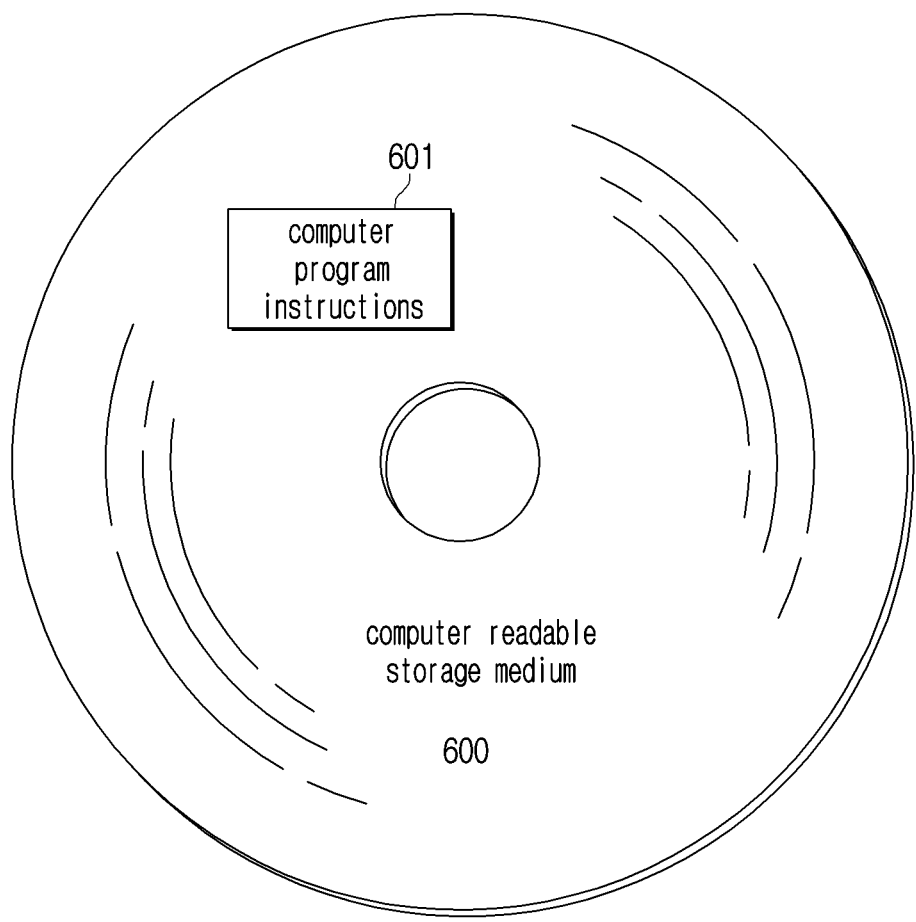
FIG. 6 is a schematic diagram illustrating a computer readable storage medium according to an embodiment.

FIG. 6 is a schematic diagram illustrating a computer readable storage medium according to an embodiment. As shown in FIG. 6, a computer readable storage medium 600 according to an embodiment includes computer program instructions 601 stored thereon. When the computer program instructions 601 are run by the processor, the neural network model training method and the image recognition method according to the embodiments described with reference to the accompanying drawings are performed. The computer readable storage medium includes, but is not limited to, for example, volatile memory and/or non-volatile memory. The volatile memory can for example include Random Access Memory (RAM) and/or cache, etc. The non-volatile memory can include, for example, Read-Only Memory (ROM), hard disk, flash memory, optical disk, magnetic disk, etc.

Those with ordinary skills in the art will understand that the units and algorithm steps of each example described in combination with the embodiments described herein can be implemented by electronic hardware or a combination of computer software and electronic hardware. Whether these functions are executed by hardware or software depends on the specific applications and design constraints of the technical schemes. Professional technicians can use different methods for each specific application to implement the described functions, but such implementation should not be considered as going beyond the scope of the disclosure.

The above describes the basic principles of the disclosure in conjunction with specific embodiments. However, it should be noted that the advantages, benefits, effects, etc. mentioned in the disclosure are only examples, but should not be construed as limitations. These advantages, benefits, effects, etc. should not be considered as necessary for one or more embodiments of the disclosure. In addition, the specific details disclosed in the above are only for the purposes of illustration and easy to understand, rather than limitations, and the aforementioned details do not limit the disclosure to the use of the aforementioned specific details for implementation.

The block diagrams of the devices, apparatuses, equipment and systems involved in the disclosure are merely illustrative examples and are not intended to require or imply that they must be connected, deployed and configured in the manner shown in the block diagrams. As will be recognized by those skilled in the art, these devices, apparatuses, equipment and systems can be connected, deployed and configured in any manner. Words such as "include", "contain", "have", etc. are open vocabulary and mean "including but not limited to" and can be used interchangeably with it. The terms "or" and "and" refer to the term "and/or" and can be used interchangeably with it, unless the context clearly indicates otherwise. The term "such as" as used here refers to the phrase "such as but not limited to" and can be used interchangeably with it.

It should also be noted that, in the system and method of the disclosure, each component or each step can be decomposed and/or recombined. Such decomposition and/or recombination should be regarded as equivalent solutions of the disclosure.

Various changes, substitutions and alterations to the one or more embodiments described herein can be made without departing from the spirit and scope of the disclosure defined by the appended claims. In addition, the scope of the claims of the disclosure is not limited to the specific aspects of the processing, machines, manufacturing, composition of event, means, methods and actions described above. The processing, machines, manufacturing, composition of event, means, method or action currently existing or to be developed later, which perform substantially the same functions or achieve substantially the same results as the corresponding aspects described herein, can be utilized. Therefore, the appended claims include such processing, machine, manufacturing, composition of event, means, methods or actions within its scope.

The above description of the various aspects is provided to enable those skilled in the art to make or use the one or more embodiments of the disclosure. Various modifications to these aspects are obvious to those skilled in the art, and the general principles defined herein can be applied to other aspects without departing from the scope of the present disclosure. Therefore, the disclosure is not intended to be limited to the aspects shown herein, but in accordance with the widest scope consistent with the principles and novel features disclosed herein.

The above description has been given for the purposes of illustration and description. In addition, the description is not intended to limit the embodiments of the present disclosure to the form disclosed herein. Although a number of example aspects and embodiments have been discussed above, those skilled in the art will recognize certain variations, modifications, changes, additions and sub-combinations thereof.

What is claimed is:

1. An electronic apparatus comprising:
   at least one processor; and
   at least one memory configured to:
      store a neural network for image recognition comprising a plurality of network layers; and
      store instructions that, when executed by the at least one processor, cause the electronic apparatus to:
         acquire a first batch of input data comprising a first plurality images and a first plurality of labels,
         train the neural network based on a first plurality of features in the first batch of input data,
         identify an active neuron and an inactive neuron from among at least one neuron included in a network layer of the plurality of network layers based on an information bottleneck of each of the at least one neuron,
         acquire at least one second batch of input data comprising a second plurality of images and a second plurality of labels,
         re-train the neural network by updating a first information bottleneck of the inactive neuron based on a second plurality of features in the at least one second batch of input data while maintaining a second information bottleneck of the active neuron,
         input at least one unlabeled image into the neural network,
         output, from the neural network, at least one predicted label, from among the first plurality of labels and the second plurality of labels, corresponding to the at least one unlabeled image,
   wherein the at least one processor is configured to execute the instructions to cause the electronic apparatus to:
      based on an amount of information corresponding to the information bottleneck of the at least one neuron exceeding a predetermined value, identify the at least one neuron at the active neuron, and
      based on the amount of information being less than or equal to the predetermined value, identify the at least one neuron as the inactive neuron, and
   wherein the amount of information comprises a first amount of information about a previous network layer encoded by the at least one neuron.

2. The electronic apparatus of claim 1, wherein the plurality of network layers comprise an input layer, at least one hidden layer and an output layer.

3. The electronic apparatus of claim 2, wherein the at least one processor is further configured to execute the instructions to cause the electronic apparatus to:
   maintain weights between the active neuron in one of the at least one hidden layer and the active neuron in the previous network layer unchanged during the re-training, reset weights between the active neuron in the one of the at least one hidden layer and the inactive neuron in the previous network layer to 0, and maintain the reset weights unchanged during the re-training, and train weights between the inactive neuron in the one of the at least one hidden layer and each neuron in the previous network layer during the re-training.

4. The electronic apparatus of claim 2, wherein the at least one processor is further configured to execute the instructions to cause the electronic apparatus to:

based on the output layer being a multi-head output layer:
maintain weights between the active neuron in the output layer and the active neuron in the previous network layer unchanged during the re-training, reset weights between the active neuron in the output layer and the inactive neuron in the previous network layer to 0, and maintain the reset weights unchanged during the re-training, train weights between the inactive neuron in the output layer and each neuron in the previous network layer during the re-training, and based on the output layer being a single-head output layer:
train weights between each neuron in the output layer and each neuron in the previous network layer during the re-training.

5. The electronic apparatus of claim 2, wherein the at least one processor is further configured to execute the instructions to cause the electronic apparatus to:

add a neuron in one of the at least one hidden layer based on an activation state of the at least one neuron included in the one of the at least one hidden layer, and re-train the neural network based on the at least one second batch of input data.

6. The electronic apparatus of claim 5, wherein the at least one processor is further configured to execute the instructions to cause the electronic apparatus to add the neuron in the one of the at least one hidden layer based on all neurons included in the one of the at least one hidden layer being the active neuron.

7. The electronic apparatus of claim 1, wherein the neural network is trained based on a loss function and a regularization term in a sparsity promoting manner which uses as few neurons as possible based on a provided input.

8. A control method of an electronic apparatus comprising:

acquiring a first batch of input data comprising a first plurality images and a first plurality of labels;

training a neural network for image recognition comprising a plurality network layers based on a first plurality of features in the first batch of input data;

identifying an active neuron and an inactive neuron from among at least one neuron included in a network layer of the plurality of network layers based on an information bottleneck of each of the at least one neuron;

acquiring at least one second batch of input data comprising a second plurality of images and a second plurality of labels;

re-training the neural network by updating a first information bottleneck of the inactive neuron based on a second plurality of features in the at least one second batch of input data while maintaining a second information bottleneck of the active neuron;

inputting at least one unlabeled image into the neural network;

outputting, from the neural network, at least one predicted label, from among the first plurality of labels and the second plurality of labels, corresponding to the at least one unlabeled image, wherein the identifying comprises:
based on an amount of information corresponding to the information bottleneck of the at least one neuron exceeding a predetermined value, identifying the at least one neuron as the active neuron, and based on the amount of information being less than or equal to the predetermined value, identifying the at least one neuron as the inactive neuron, and wherein the amount of information comprises a first amount of information about a previous network layer encoded by the at least one neuron.

9. The control method of claim 8, wherein the plurality of network layers comprise an input layer, at least one hidden layer and an output layer.

10. The control method of claim 9, wherein the re-training comprises:

maintaining weights between the active neuron in one of the at least one hidden layer and the active neuron in the previous network layer unchanged during the re-training, resetting weights between the active neuron in the one of the at least one hidden layer and the inactive neuron in the previous network layer to 0, and maintaining the reset weights unchanged during the re-training, and training weights between the inactive neuron in the one of the at least one hidden layer and each neuron in the previous network layer during the re-training.

11. The control method of claim 9, wherein the re-training comprises:

based on the output layer being a multi-head output layer:
maintaining weights between the active neuron in the output layer and the active neuron in the previous network layer unchanged during the re-training, resetting weights between the active neuron in the output layer and the inactive neuron in the previous network layer to 0, and maintaining the reset weights unchanged during the re-training, training weights between the inactive neuron in the output layer and each neuron in the previous network layer during the re-training, and based on the output layer being a single-head output layer:
training weights between each neuron in the output layer and each neuron in the previous network layer during the re-training.

12. The control method of claim 9, further comprising:
adding a neuron in one of the at least one hidden layer based on an activation state of the at least one neuron included in the one of the at least one hidden layer, and re-training the neural network based on the at least one second batch of input data.

13. The control method of claim 12, wherein the adding the neuron comprises adding the neuron in the one of the at least one hidden layer based on all neurons included in the one of the at least one hidden layer being the active neuron.

14. The control method of claim 8, wherein the neural network is trained based on a loss function and a regularization term in a sparsity promoting manner which uses as few neurons as possible based on a provided input.

* * * * *